United States Patent
Tu et al.

(10) Patent No.: US 7,945,383 B2
(45) Date of Patent: May 17, 2011

(54) ROUTE DETERMINATION METHOD AND APPARATUS FOR NAVIGATION SYSTEM

(75) Inventors: Ihung Tu, Torrance, CA (US); David Schaaf, Torrance, CA (US); Tien Vu, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 1753 days.

(21) Appl. No.: 11/109,991

(22) Filed: Apr. 20, 2005

(65) Prior Publication Data

US 2006/0241854 A1 Oct. 26, 2006

(51) Int. Cl.
*G01C 21/26* (2006.01)

(52) U.S. Cl. ........ 701/202; 701/201; 701/208; 701/209; 701/210; 701/211; 701/217; 340/990; 340/995.2; 340/995.17; 340/995.21; 340/995.23; 340/995.24; 340/988; 709/243

(58) Field of Classification Search ................... 701/202, 701/201, 208, 209, 210, 211, 217; 340/990, 340/995.2, 995.17, 995.21, 995.23, 995.24, 340/988; 709/243
See application file for complete search history.

(56) References Cited

U.S. PATENT DOCUMENTS

| | | | | |
|---|---|---|---|---|
| 5,428,544 A | * | 6/1995 | Shyu | 701/117 |
| 5,754,430 A | * | 5/1998 | Sawada | 701/209 |
| 5,884,218 A | * | 3/1999 | Nimura et al. | 701/208 |
| 5,938,720 A | | 8/1999 | Tamai | |
| 5,944,768 A | * | 8/1999 | Ito et al. | 701/200 |
| 6,853,917 B2 | * | 2/2005 | Miwa | 701/213 |
| 2002/0156739 A1 | * | 10/2002 | Hirai et al. | 705/52 |
| 2008/0077322 A1 | * | 3/2008 | Sumizawa | 701/210 |

FOREIGN PATENT DOCUMENTS

JP 2000-136939 5/2000

* cited by examiner

*Primary Examiner* — Khoi Tran
*Assistant Examiner* — Brian J Broadhead
(74) *Attorney, Agent, or Firm* — Muramatsu & Associates

(57) ABSTRACT

A navigation system is able to find an optimum route to a destination even when a large non-digitized area exists between a starting point to the destination. The navigation system produces processing points based on a particular shape and size of the large non-digitized area and determines whether such processing points should be used for route search operations. When it is determined that the route search operation is effective, the navigation system performs A* algorithm search operations with respect to the start point, processing points and the destination and detects an optimum route to detour the large non-digitized area.

18 Claims, 22 Drawing Sheets

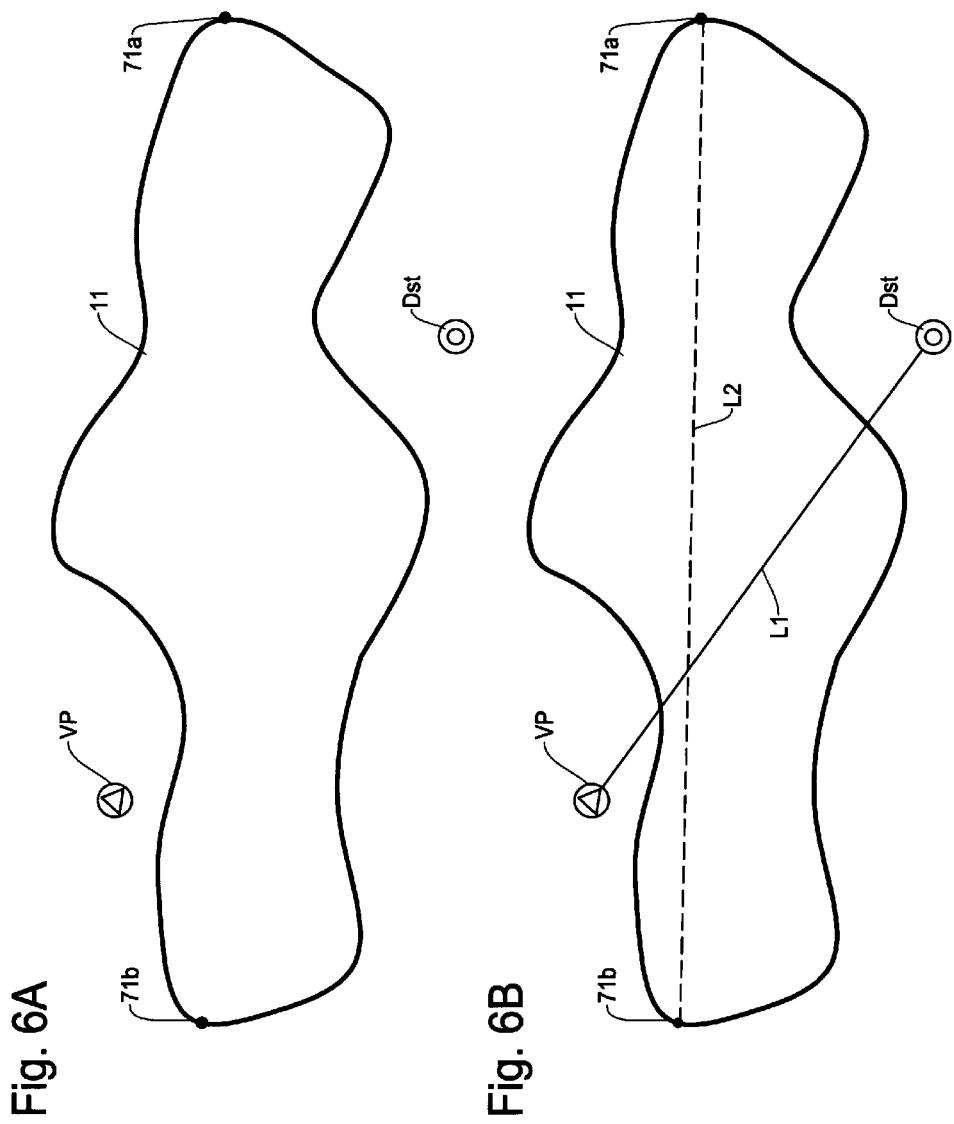

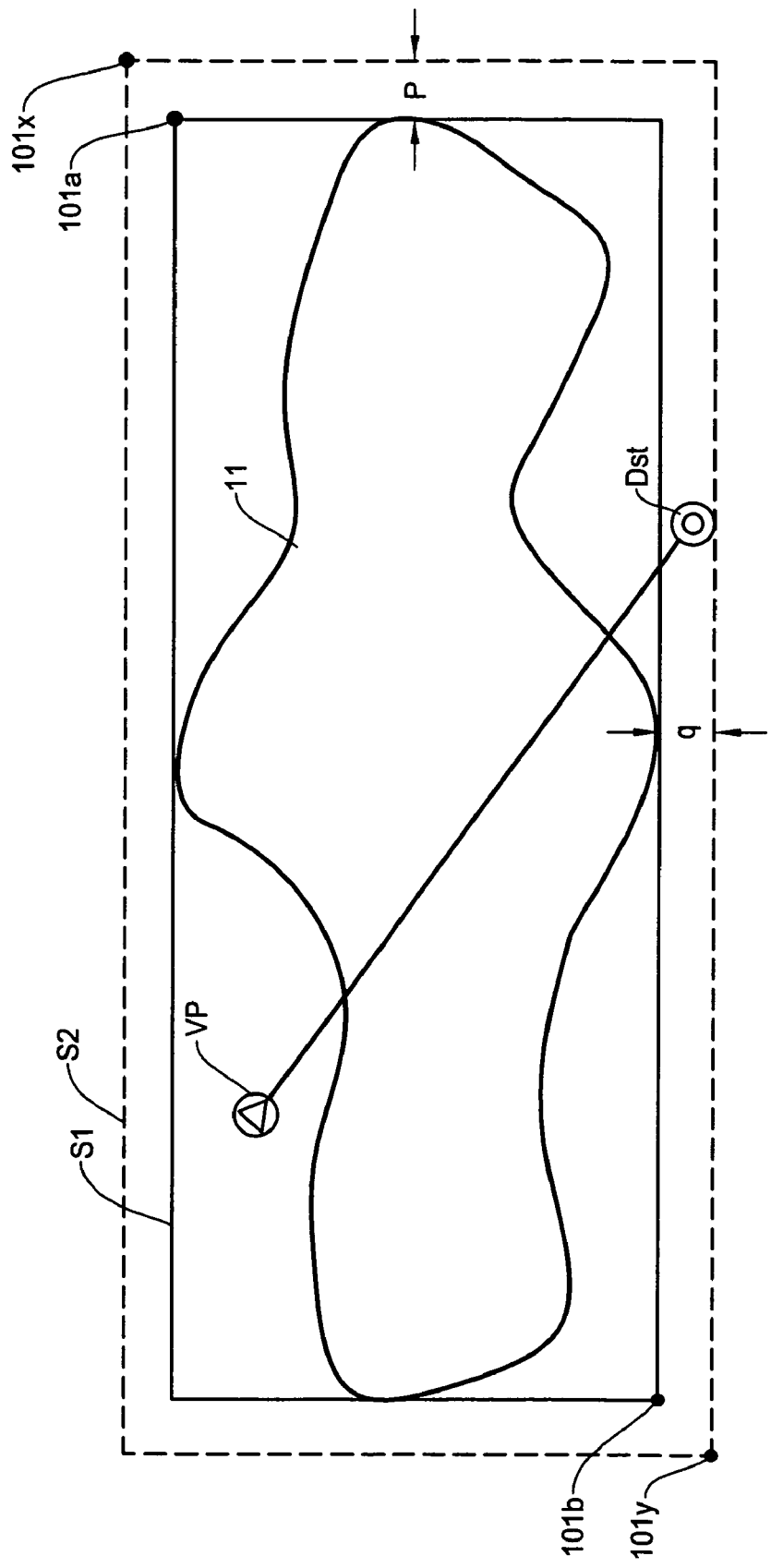

ROUTE DETERMINATION METHOD AND APPARATUS FOR NAVIGATION SYSTEM

FIELD OF THE INVENTION

This invention relates to a navigation method and system, and more specifically, to a method and apparatus for use with a navigation system for efficiently and accurately determining an optimal route to a destination when there is a large area of non-digitized map data between the start position and the destination.

BACKGROUND OF THE INVENTION

A navigation system performs travel guidance for enabling a user to easily and quickly reach a selected destination. A typical example is a vehicle navigation system where a vehicle is equipped with a navigation function. Such a navigation system detects the position of the user or user's vehicle, and reads out map data pertaining to an area at the current vehicle position from a map storage medium. The navigation system displays a map image on a monitor screen while superimposing a mark representing the current location of the user on the map image. When a destination is set, the navigation system starts a route guidance function for setting a guided route from the start point to the destination based on the map data. The navigation system calculates and determines an optimum route, such as a shortest route to the destination based on various parameters.

To determine a route to a destination, currently available vehicle navigation systems typically employ a search algorithm called an "A*" algorithm which is based on the graphic search technique used in the artificial intelligence (AI). In general, the A* algorithm performs a directed search through the graph, i.e., map data, from the start point to the destination, by building a tree of possible solution paths as it progresses, the root of the tree being the source segment.

The A* algorithms iterates by determining all of the nearest connected segments to each "branch" or tree segment beginning with the start point (current vehicle position VP) segment. A cost (f(n)) for each segment is then determined according to the formula:

$$f(n) = g(n) + h(n) \tag{1}$$

where g(n) represents the known cost from the source segment to segment n, and h(n) representing the heuristic cost from a segment n to the destination. The heuristic cost is essentially an intelligent guess of the actual cost (distance, time, money, etc) from the segment n to the destination. The segment with the lowest overall cost is then selected as a part of the route and the algorithm continues until a segment corresponding to the desired destination is selected. The use of the cost formula in equation (1) has the effect of progressively narrowing the search area toward the destination.

The search may be conducted from the start point to the destination. In the alternative, the search may be conducted from both the start point to the destination and from the destination to the start point simultaneously. An example of this two ended search is shown in FIGS. 1A and 1B. In this example, the navigation system simultaneously searches a route from the current vehicle position (start point) VP to the destination Dst. Two elliptic marks A1 and A2 indicate general search directions and search areas for the search operations using the A* algorithm.

Basically, the search direction is on a direct line connecting the vehicle position VP and the destination Dst. The elliptic marks A1 and A2 are established from the vehicle position VP to the destination Dst and vice versa to limit the search directions and search areas. As the search progresses, the segments of routes from the vehicle position VP and to the destination Dst meet to create a completed route (calculated route) that connects the current vehicle position VP and the destination Dst.

Through the A* algorithm search, the navigation system can generally find an optimum route to a destination based on various cost parameters. For example, the optimum route is determined based on the shortest way to reach the destination, the quickest way to reach the destination, the route preferring freeways to surface roads, the least expensive route to the destination, the route without using toll road, or the like. However, in some cases, a conventional method utilizing the A* algorithm search fails to find an appropriate route to the destination. Such an example is explained below with reference to FIGS. 2A and 2B and FIG. 3.

FIGS. 2A and 2B are schematic diagrams showing the situation where the two ended search using the A* algorithm is used for a route calculation from a vehicle position VP to a destination Dst when a large area of non-digitized map data exists between them. In the situation shown in FIGS. 2A and 2B, there is a large lake 11 between the vehicle position VP and the destination Dst. The lake 11 is regarded as a non-digitized area because there are no road segments in the map data in the navigation system with respect to the inner area of the lake 11. Similar situation may arise for deserts, high mountains, jungles, swamp, etc.

When the navigation system starts to search a route, the navigation system will attempt to search in the directions and areas shown in search areas SA1 and SA2 indicated by hyperbolic curves. As noted above, ordinarily, the A* algorithm search attempts to search routes in the predetermined areas in the direction between the vehicle position and the destination defined by the search areas SA1 and SA2. The A* algorithm usually reduces heuristic cost by selecting a road segment that heads closer to a destination point. However, as shown in FIG. 2B, because there is no roads or paths within the lake 11, the route search in the direction and ranges indicated by search areas SA1 and SA2 toward the lake 11 becomes meaningless.

Therefore, in such a situation, a route search must be conducted without limiting the direction and area of search to find a route to the destination. Referring to FIG. 3, a possible fault is illustrated that may result from such a route search when a large non-digitized area exists between the current vehicle position VP and the destination Dst. As a result of such a route search operation between the vehicle position VP and the destination Dst without limiting the search directions and areas, the navigation system may produce a calculated route to the destination Dst using routes R1 and R3 as shown in FIG. 3.

However, although this route can guide the user to the destination Dst, it is not a very efficient route because the search directions and areas are not limited during the search. As indicated in FIG. 3, the user can reach the destination with a shorter distance by taking a route R2 instead of taking the route R1 in the first place. Namely, in the conventional technology, due to the lake 11 which does not have any road segments, the route search procedure is forced to proceed without limiting the search direction to avoid the lake 11. As a result, the navigation system tends to fail in detecting an optimum route such as a one using the route R2 in the example of FIG. 3.

Therefore, it is desired that a navigation system overcomes the shortcomings described above so that it can find an efficient route to a destination even when a large non-digitized area exists between the starting point and the destination.

SUMMARY OF THE INVENTION

It is, therefore, an object of this invention to provide a route calculation method and apparatus that can find an optimum route to a destination even when a large non-digitized area exists between a starting point to the destination.

It is another object of the present invention to provide a route determination method that can produce processing points based on a shape and size of a large non-digitized area and determine whether such processing points should be used for route search operations.

It is a further object of the present invention to provide a route determination method and apparatus that can detect an optimum route to detour a large non-road area such as a lake, desert, jungle, etc., to reach a destination by applying an A* algorithm search.

One aspect of the present invention is a method of calculating a route from a start point to a destination. The method is comprised of the steps of: determining whether a non-digitized area exists between the start point and the destination; creating a processing point that acts as an intermediary point between the start point and the destination; performing a first route search using an A* algorithm between the start point and the processing point to produce a first part of a calculated route; performing a second route search using an A* algorithm between the destination and the processing point to produce a second part of the calculated route; and combining the first part and second part to complete the calculated route that connects the start point and the destination.

In the present invention, the step of determining the existence of the non-digitized area includes a step of finding polygon data representing the non-digitized area through map data from a map storage medium. Further, the step of establishing the processing point includes a step of finding two furthest points of the non-digitized area. Alternatively, the step of establishing the processing point includes a step of creating a rectangle each side of which contacts with farthest point of the non-digitized area or is apart from the farthest points of the non-digitized area by a predetermined distance.

The method of the present invention further includes a step of determining whether a route search operation using the processing point is necessary based on a particular shape, size, and location of the non-digitized area relative to the locations of the start point and the destination. More specifically, the step of determining whether the route search operation using the processing point is necessary includes a step of determining whether a straight line connecting the start point and the destination and a longest line connecting two farthest points of the non-digitized area cross with one another, and a step of determining whether the longest line connecting the farthest points of the non-digitized area is longer than the straight line connecting the start point and the destination.

Preferably, the method of the present invention produces two calculated routes that roundabout the non-digitized area by applying the route search operations to two processing points. Then, the method of the present invention compares the two calculated routes with respect to predetermined criteria and selects one of the routes as an optimum route between the start point and the destination.

Another aspect of the present invention is an apparatus for calculating an optimum route to the destination when a large non-digitized area exists between the start point and the destination. The apparatus is designed to produce the most effective route by applying the A* algorithm search with respect to the start point, processing points and the destination and detects an optimum route to detour the large non-digitized area.

According to the present invention, the navigation system is able to find an optimum route to a destination even when a large non-digitized area exists between a starting point to the destination. The navigation system produces processing points based on a particular shape and size of the large non-digitized area and determines whether such processing points should be used for route search operations. When it is determined that the route search operation is effective, the navigation system performs A* algorithm search operations with respect to the start point, processing points and the destination and detects an optimum route to detour the large non-digitized area.

BRIEF DESCRIPTION OF THE DRAWINGS

FIGS. 6A-6F are schematic diagrams showing the steps of determining a route in the present invention when a large non-digitized area such as a lake exists between a start point and a destination. FIG. 6A is a process to find processing points based on the longest diagonal line of the lake, FIG. 6B is a process to determine if the diagonal line crosses a straight line connecting the start point and the destination, FIG. 6C is a process to perform an A* search between the start point and a first processing point, FIG. 6D is a process to perform an A* search between the destination and the first processing point, FIG. 6E is a process to perform an A* search between the destination and a second processing point, and FIG. 6F is a process to perform an A* search between the start point and the second processing point.

FIGS. 7A-7E are schematic diagrams showing the steps of determining a route from a start point to a destination in another embodiment of the present invention. FIG. 7A shows a condition where the navigation system finds two processing points formed based on a rectangle that is tangential with the lake, FIG. 7B is a process to perform an A* search between the start point and a first processing point, FIG. 7C is a process to perform an A* search between the designation and the first processing point, FIG. 7D is a process to perform an A* search between the destination and a second processing point, and FIG. 7E is a process to perform an A* search between the start point and the second processing point.

FIG. 8A is a process to perform an A* search between the start point and a first processing point, FIG. 8B is a process to perform an A* search between the destination and the first processing point, FIG. 8C shows a calculated route to the destination obtained by using the first processing point, FIG. 8D is a process to perform an A* search between the start point and a second processing diagonal point, FIG. 8E is process to perform an A* search between the destination and the second processing point, and FIG. 8F shows a calculated route to the destination obtained by using the second processing point.

DETAILED DESCRIPTION OF THE INVENTION

The present invention will be described in detail with reference to the accompanying drawings. In the present invention, in a case where a large non-digitized area exists between a current vehicle position (start point) and a destination, the navigation system creates one or more processing (midway) points to direct a route search (A* algorithm search) to the processing points to find more efficient routes to a destination. A first route search operation is conducted in a direction connecting between the current vehicle position and a processing point for the predetermined search areas. A second route search operation is conducted in a direction connecting between the destination and the processing point for the predetermined search areas. An overall route to the destination will be established by connecting the routes found in the first and second route search operations.

Preferably, two processing points will be established based on a particular shape of the non-digitized (non-road segment) area, such as a lake, desert, mountain, jungles, swamp, etc. Ordinarily, such non-digitized areas are provided as polygon data in the map storage medium where the polygon data express two dimensional shape, size, and location of such areas. First and second route search operations will be conducted with respect to the current vehicle position (start point), a first processing point, and the destination, thereby producing a first calculated route to the destination. Further, preferably, first and second route search operations will be conducted with respect to the vehicle position, a second processing point, and the destination, thereby producing second first calculated route to the destination. The navigation system selects one of the first and second calculated routes as an optimum route based on cost analysis (time, distance, fees, etc.).

Figure 4:
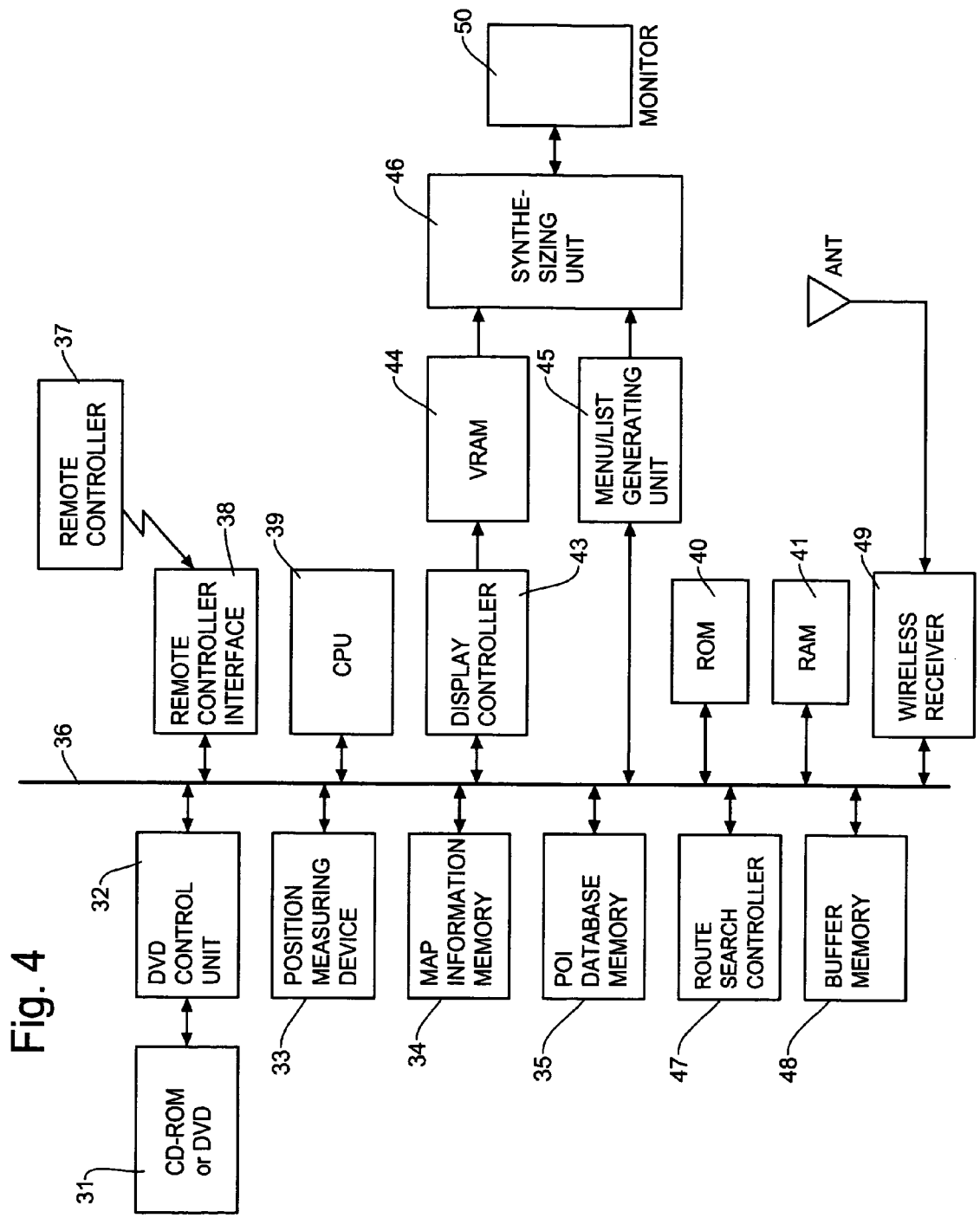
FIG. 4 is a block diagram showing an example of structure of a vehicle navigation system implementing the present invention for calculating an efficient route from a start point to a destination when a large non-digitized area intercepts therebetween.

FIG. 4 shows an example of structure of a vehicle navigation system implementing the present invention, although the present invention can also be applied to a portable navigation device such as a one implemented by a PDA (personal digital assistant) device or other hand-held devices. In the block diagram of FIG. 4, the navigation system includes a map storage medium 31 such as a CD-ROM, DVD, hard disc or other storage means for storing map information, a DVD control unit 32 for controlling an operation for reading the map information from the map storage medium 31, and a position measuring device 33 for measuring the present vehicle position. The position measuring device 33 has a vehicle speed sensor for detecting a moving distance, a gyroscope for detecting a moving direction or angle, a microprocessor for calculating a position, a GPS (Global Positioning System) receiver for detecting a position, and etc.

The block diagram of FIG. 4 further includes a map information memory 34 for storing the map information which is read out from the DVD (map storage medium) 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

The remote controller 37 has a variety of function keys to make inputs to the navigation system. The navigation system may include various other input methods to achieve the same and similar operations done through the remote controller. The navigation system further includes a bus 36 for interfacing the above units in the system, a processor (CPU) 39 for controlling an overall operation of the navigation system, a ROM 40 for storing various control programs such as a route search program, a map matching program necessary for navigation control, and a RAM 41 for storing a processing result such as a guide route.

The navigation system further includes a display controller 43 for generating a map image (a map guide image and an arrow guide image) on the basis of the map information, a VRAM (video RAM) 44 for storing images generated by the display controller, a menu/list generating unit 45 for generating menu image/various list images, a synthesizing unit 46, a monitor (display) 50 and a wireless receiver 49 for receiving information, such as traffic information through a wireless communication, a route search controller 47, a buffer memory 48, and the like.

The route search controller 47, the map storage medium (DVD) 31, the monitor 50, and the buffer memory 48 perform a major function of the present invention for determining an optimum route to a destination when a large restricted area, i.e., non-digitized (non-road) area exists between the current position (start point) and the destination. When such a large non-digitized area is found in the direction toward the destination, the route search controller 47 checks the shape, size and location of the restricted area with use of polygon data retrieved from the map storage medium 31. Based on the specific shape and size of the restricted area, the route search controller 47 determines a processing point and conducts route search (A* algorithm) among the start point, processing point, and the destination, thereby detecting a route that effectively detours the restricted area.

Figure 5:
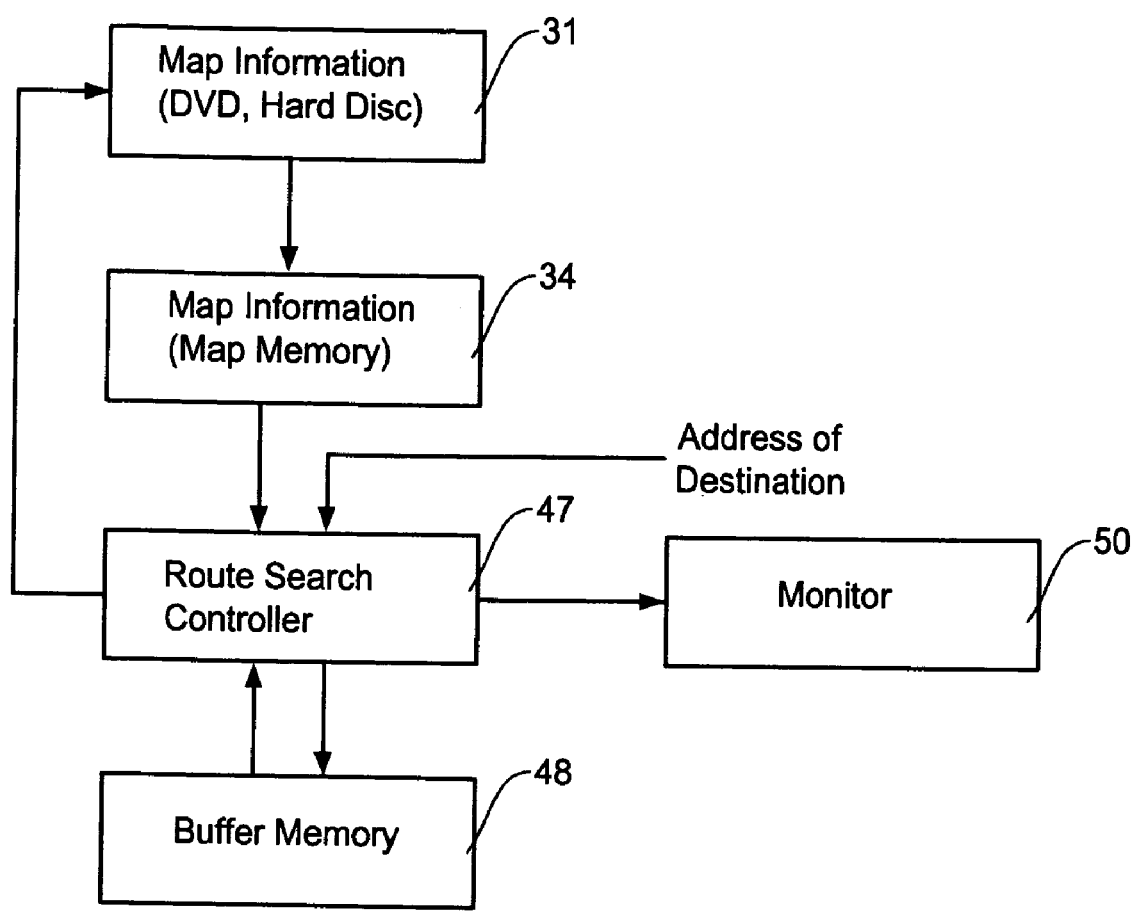
FIG. 5 is a schematic diagram showing essential components of the route determination apparatus of the present invention for calculating an efficient route from a current vehicle position to a destination when a large non-digitized area exists between the vehicle position and the destination.

FIG. 5 shows essential components of the route determination apparatus of the present invention for calculating an efficient route from a current vehicle position to a destination when a large non-digitized area intercepts between the vehicle position and the destination. In this block diagram, the components in the structure of FIG. 4 which are directly involved in the operation of the present invention are shown for illustrating the essential structure of the present invention. The route determination apparatus of FIG. 5 includes the map storage medium 31 such as a DVD or hard disc, the map information memory 34, the route search controller 47, the buffer memory 48, and the monitor 50. The route search controller 47 can be a part of the CPU 39 in FIG. 4 or a separate microprocessor.

When the user selects a destination, the route search controller 47 reads map information 34 from the map information storage medium 31. The route search controller 47 determines if a large non-digitized area exists between a current vehicle position (start point) and a destination (target point). The large non-digitized area is an area without roads, an example of which includes a lake, a high mountain, desert, military base, jungles, swamp, etc. In the map data, such a non-digitized area is represented by polygon data which is a type of data expressing a two dimensional shape, size and location of the non-digitized (no road segments) area. In contrast, streets, railroads, etc. are represented by road segments in the map data.

If such a non-digitized area exits, the route search controller 47 will perform a route search operation that produces an effective roundabout way. The route search controller 47 creates a processing point for defining a search area and a search direction for conducting an A* algorithm search. A first route search operation is conducted in a direction connecting between the current vehicle position (start point) and a processing point for the predetermined search areas. Then, a second route search operation is conducted in a direction connecting between the destination (target point) and the processing point for the predetermined search areas.

An overall route to the destination will be established by connecting the routes found in the first and second route search operations. Preferably, two processing points are created based on a particular shape and size of the non-digitized area for the A* algorithm search as will be described later. In such a case, the first and second route search operations are conducted for the respective processing point. The buffer memory 48 will be used for temporarily storing the data necessary for the route search processing. After the route is calculated, the route search controller 47 causes to display the result on the monitor 50.

FIG. 6A to 6F are schematic diagrams showing the principle of operation for calculating a route from a start point to a destination in accordance with the present invention when a large non-digitized area exists between the start point and the destination. In this example, the vehicle position VP, which is also referred to as a start point, and the destination Dst is intercepted by a lake 11. The navigation system is able to detect the lake 11 because such a non-digitized area is represented by polygon data in the map data as noted above.

FIG. 6A shows a situation where the navigation system is in the process for determining processing points for applying a route search operation (A* algorithm search) based on the particular shape and size of the lake 11. The navigation system will determine the longest diagonal line of the lake 11 to obtain processing (midway) points 71a and 71b. These processing points will be used as intermediary points in calculating the route from the vehicle position VP to the destination Dst through the A* algorithm search as will be explained in detail.

FIG. 6B shows a situation where the navigation system determines if a straight line L1 connecting between the vehicle position VP and the destination Dst crosses the longest line L2 connecting the farthest points of the lake 11. When both lines cross with one another, the navigation system will perform the route calculation using the processing points 71a and 71b when the straight line L2 formed by the processing points 71a and 71b is longer than the straight line L1 formed by the vehicle position VP and the destination Dst. This process is to determine whether a route search operation using the A* algorithm has to incorporate different search directions rather than a basic operation of FIG. 3.

In the example of FIG. 6B, because the line L2 is longer than the line L1, the navigation system will determine that the route calculation using the processing points 71a and 71b is effective. This is because since the line L2 is longer than the line L1, a substantial detour has to be made to reach the destination, the route search operation must be conducted in a direction different from the direction of the line L1 that simply connects the vehicle position VP and the destination Dst. Other condition may also be used to determine whether processing points are to be used for calculating a route in the navigation system. For example, the navigation system may consider the ratio between the line formed by farthest points 71a and 71b and the line between the vehicle position VP and the destination Dst.

Figure 6C:
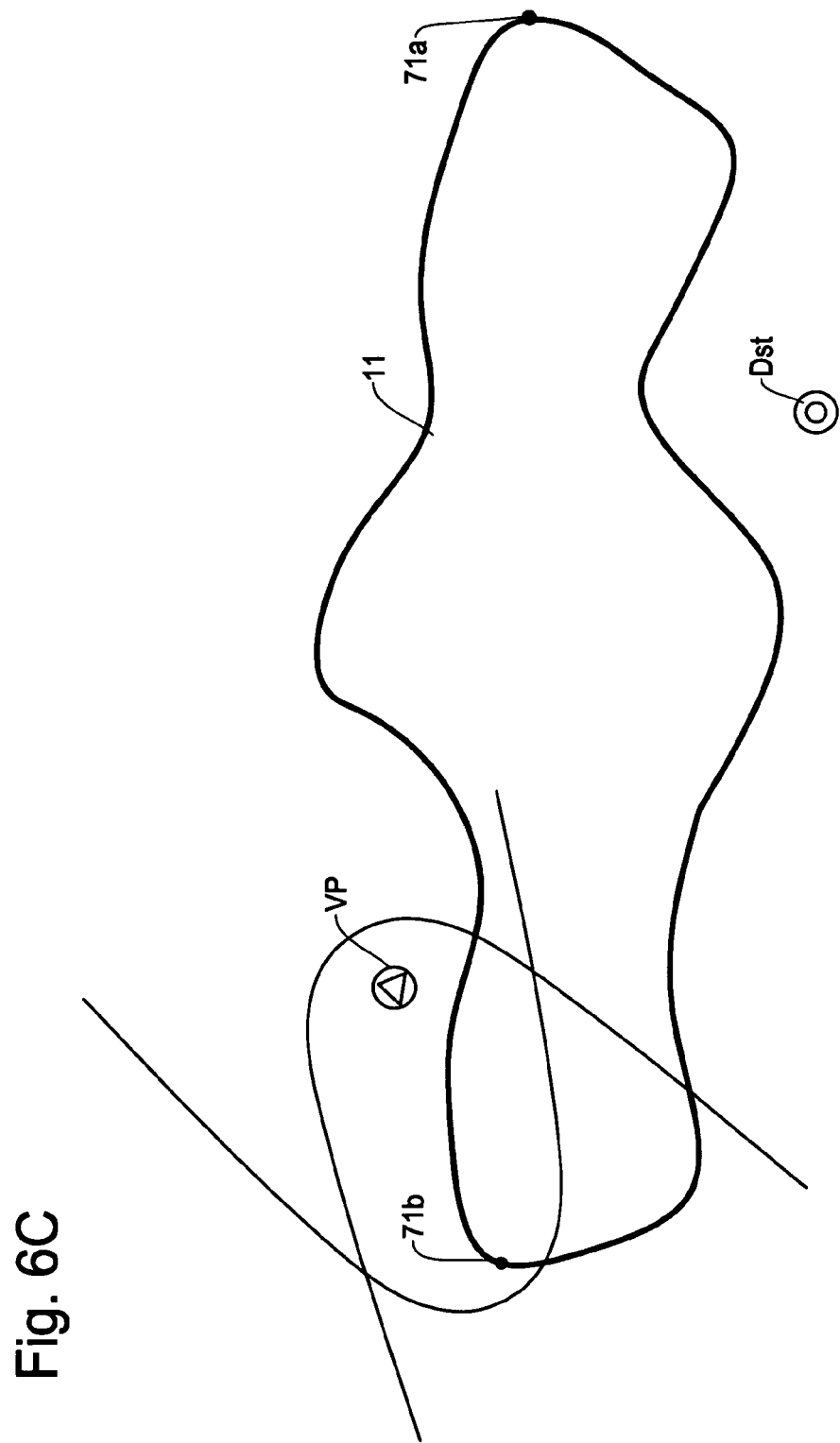

FIG. 6C shows a situation where the navigation system performs a first A* algorithm search between the vehicle position VP and one of the processing points. As shown by hyperbolic lines, the search directions and areas are oriented between the vehicle position VP and the processing point 71b. The curves of the hyperbolic lines will be selected to determine an appropriate size of the search areas. In the present invention, the navigation system will search a route toward the processing point 71b which is not a destination but a mere midway point to produce a first part of the roundabout route.

Figure 6D:
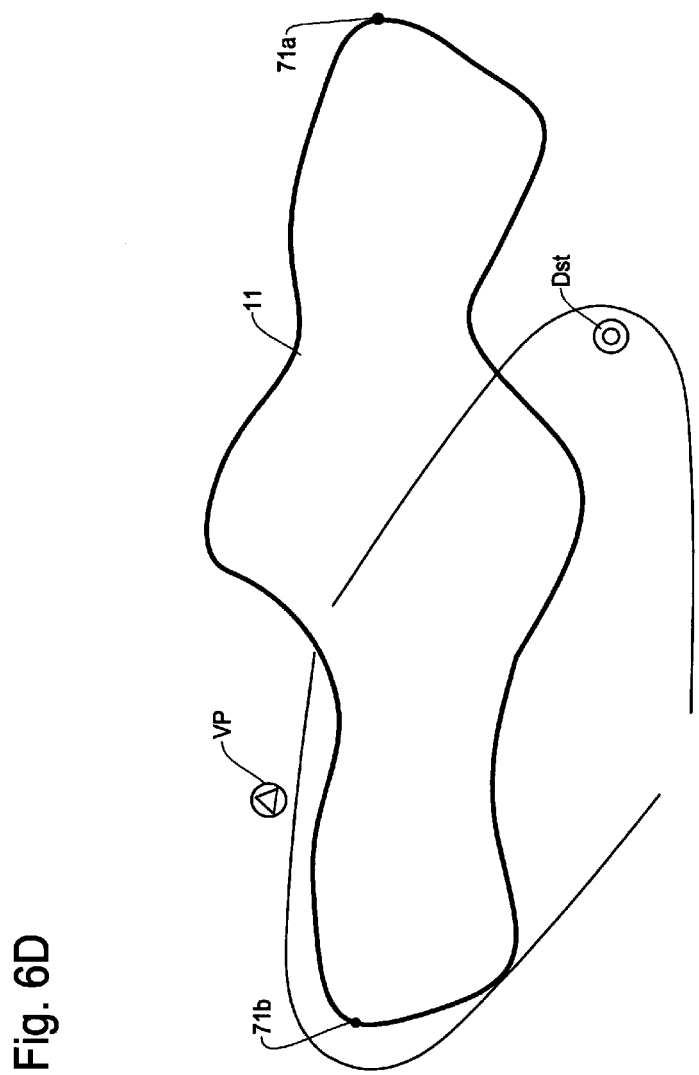

FIG. 6D shows a situation where the navigation system performs a second A* algorithm search between the destination Dst and the processing point 71b used in the step of FIG. 6C. As shown by hyperbolic lines, the search directions and areas are oriented between the processing point 71b and the destination Dst. Thus, the navigation system will search a route toward the processing point 71b from the destination Dst to produce a second part of the roundabout route. By connecting the first and second parts of the roundabout route, one candidate route between the vehicle position VP and the destination Dst is obtained.

Figure 6E:
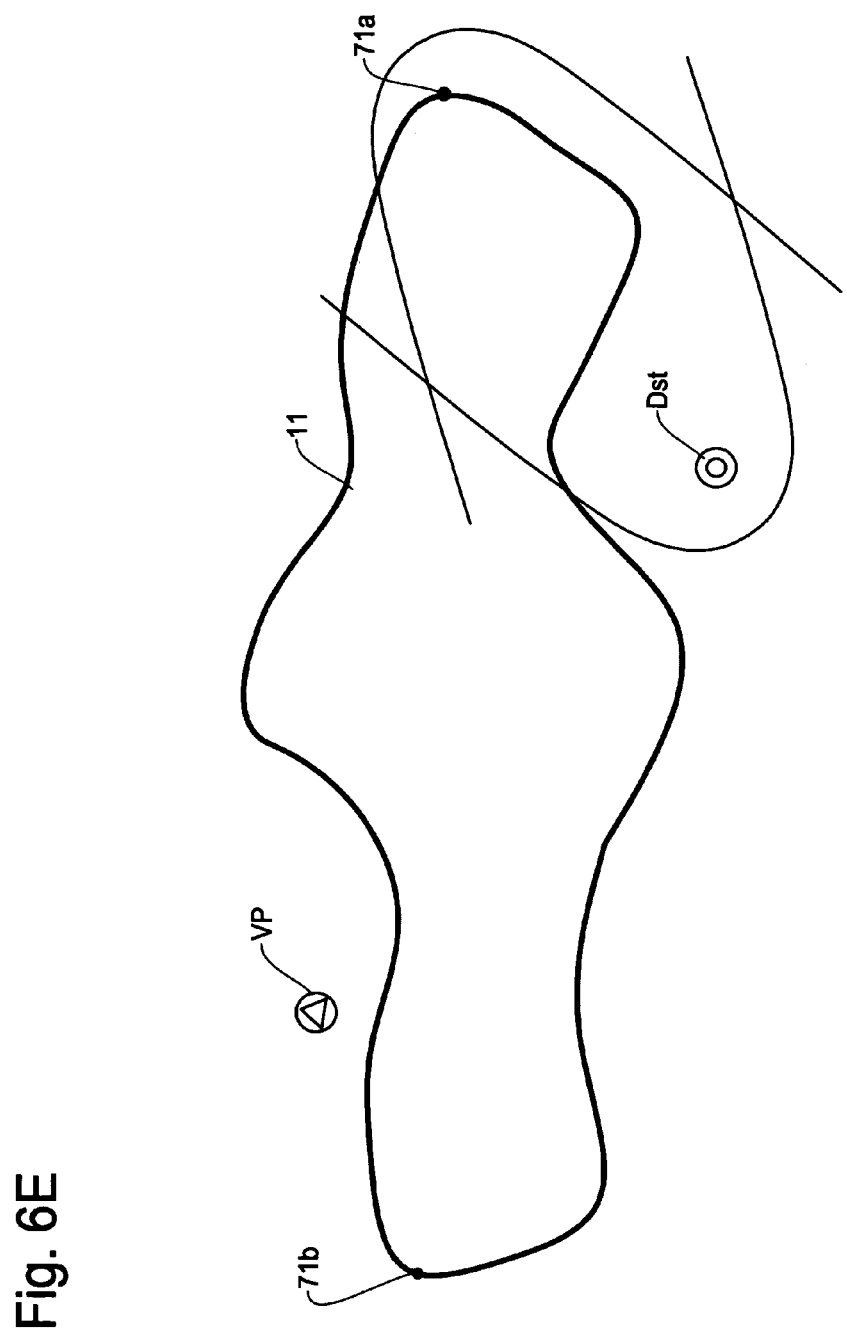
Figure 6F:
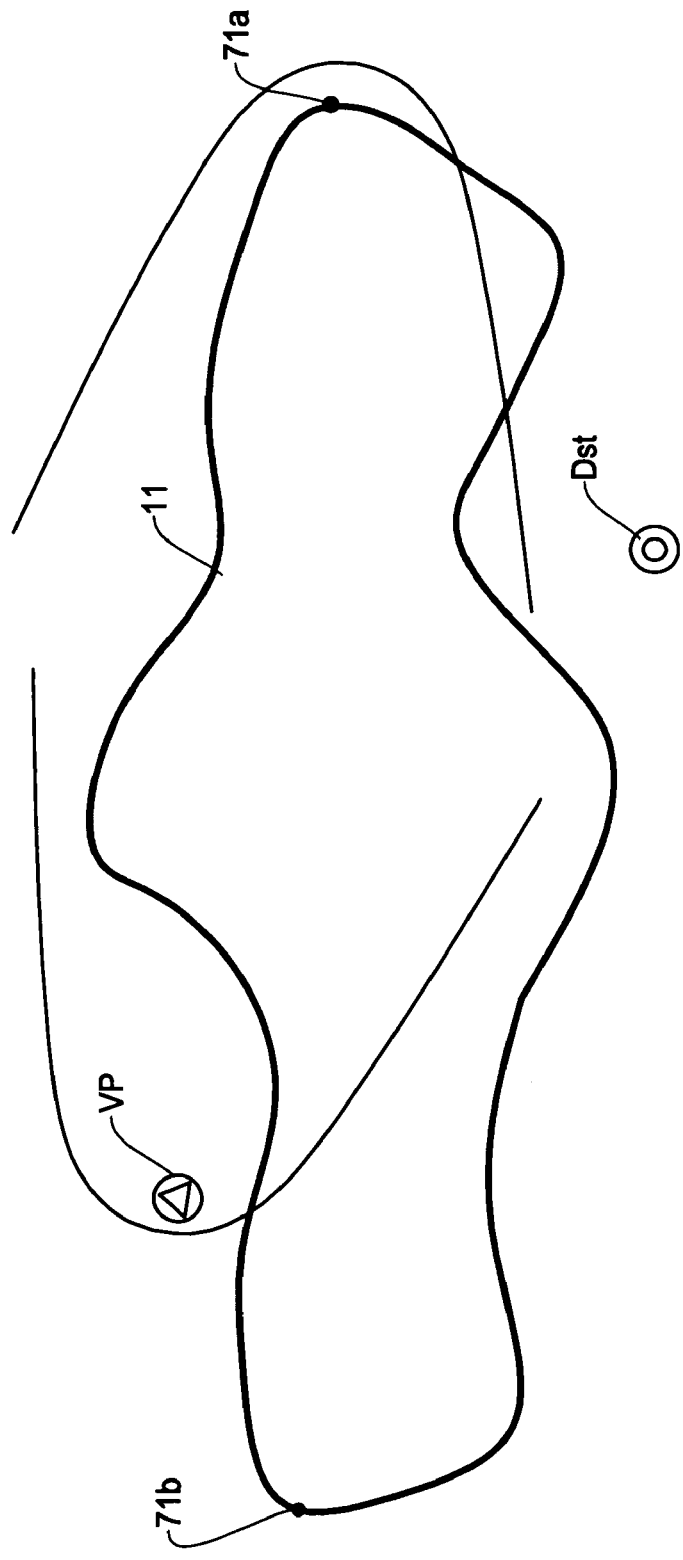

FIGS. 6E and 6F correspond to FIGS. 6C and 6D where route search operation is conducted by using the other processing point 71a. Namely, FIG. 6E shows a situation where the navigation system performs an A* algorithm search between the destination Dst and the processing point 71a. As shown by hyperbolic lines, the search directions and areas are oriented between the processing point 71a and the destination Dst. Thus, the navigation system will search a route toward the processing point 71a from the destination Dst to produce a first part of another roundabout route.

FIG. 6F shows a situation where the navigation system performs an A* algorithm search between the vehicle position VP and the processing point 71a. As shown by hyperbolic lines, the search directions and areas are oriented between the vehicle position VP and the processing point 71a. Thus, the navigation system will search a route toward the processing point 71a from the vehicle position VP to produce a second part of the another roundabout route. By connecting the first and second parts of the roundabout route, another candidate route between the vehicle position VP and the destination Dst is obtained. Thus, the navigation system obtains two candidate routes. The navigation system will compare these calculated routes and select one of the routes as an optimum route based on the cost analysis (time, distance, drive conditions, fees, etc.).

Figure 7B:
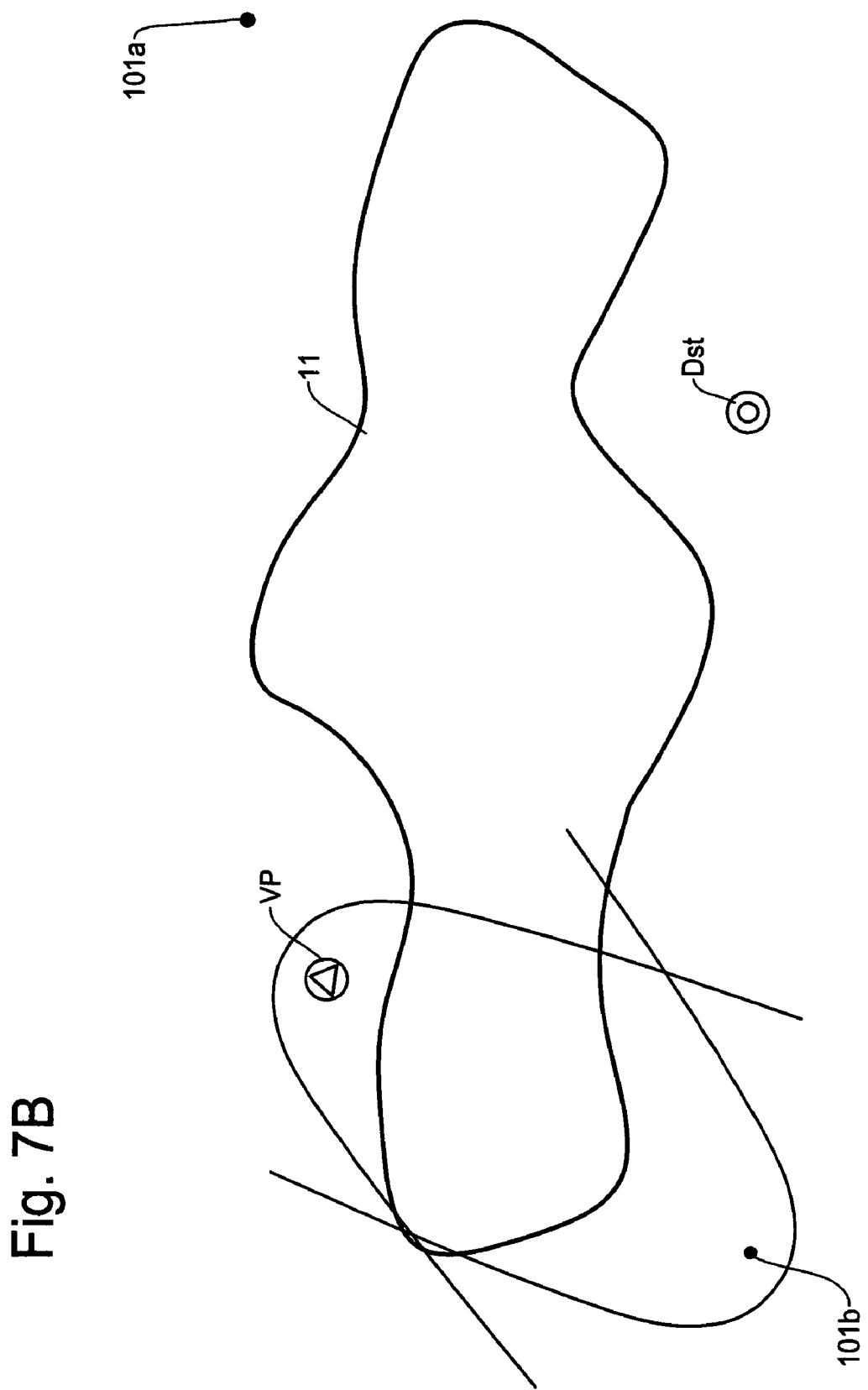

Another embodiment of the present invention for determining a route is explained with reference to FIGS. 7A to 7E which show the principle of operation in the second embodiment. This method is different from the embodiment described with reference to FIGS. 6A to 6F in that this method creates the processing points by corner points of a rectangle contacts with outer periphery of a non-digitized area. As shown in FIG. 7A, the navigation system creates two processing points 101a and 101b by placing a rectangle S1 that covers the non-digitized area, i.e., the lake 11.

In this example, the rectangle is so configured that each side of the rectangle S1 contacts the farthest point of the lake 11. It is also possible to use a larger rectangle S2 so that each side of such a rectangle is apart from the farthest points of the lake by predetermined distances (p, q) such as 0.5 miles to create processing points 101x and 101y. In the following descriptions, the processing points 101a and 101b based on the rectangle S1 are used as midway destination points in the route search operation. The navigation system determines whether to use the processing points for the route calculation by the process described above with reference to FIG. 6B.

FIG. 7B shows a situation where the navigation system performs an A* algorithm search between the vehicle position VP and the processing point 101b. As shown by hyperbolic lines, the search directions and areas are oriented between the vehicle position VP and the processing point 101b. Thus, the navigation system will search a route toward the processing point 101b from the vehicle position VP to produce a first part of a roundabout route.

Figure 7C:
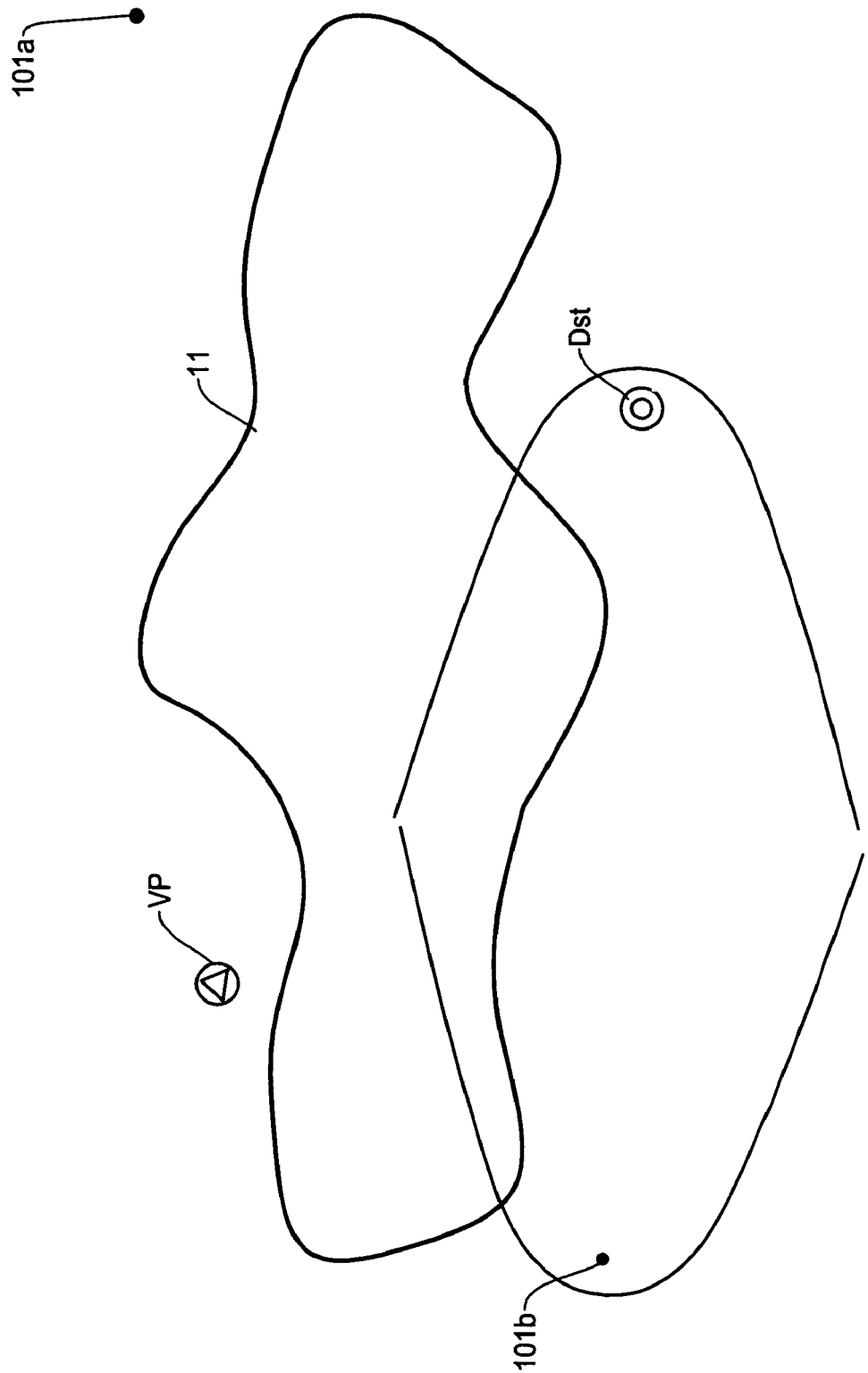

FIG. 7C shows a situation where the navigation system performs an A* algorithm search between the processing point 101b and the destination Dst. As shown by hyperbolic lines, the search directions and areas are oriented between the destination Dst and the processing point 101b. Thus, the navigation system will search a route toward the processing point 101b from the destination Dst to produce a second part of the roundabout route. By connecting the first and second parts of the roundabout route, one candidate route between the vehicle position VP and the destination Dst is obtained.

Figure 7D:
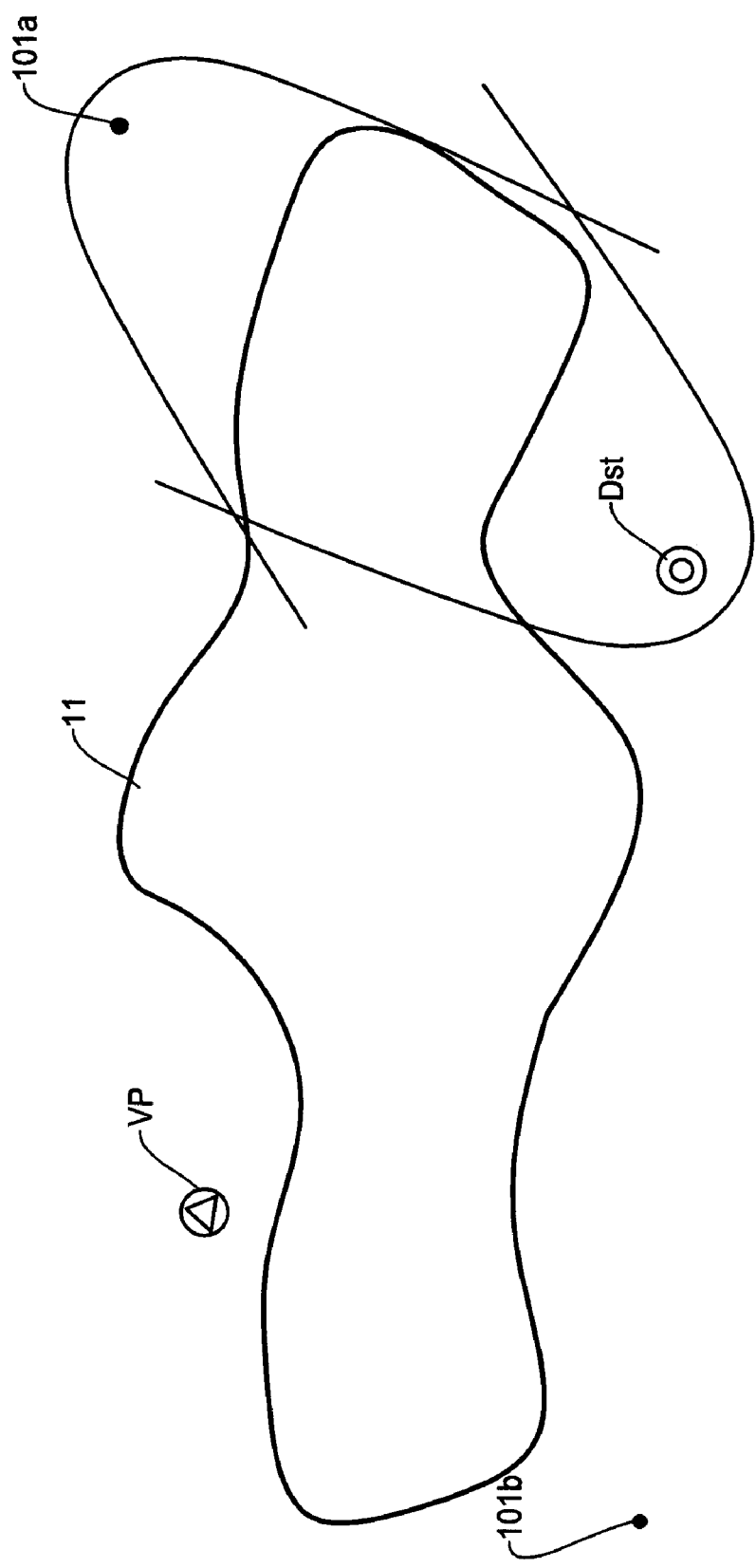

FIG. 7D shows a situation where the navigation system performs an A* algorithm search between the destination Dst and the processing point 101a. As shown by hyperbolic lines, the search directions and areas are oriented between the destination Dst and the processing point 101a. Thus, the navigation system will search a route toward the processing point 101a from the destination Dst to produce a first part of another roundabout route.

Figure 7E:
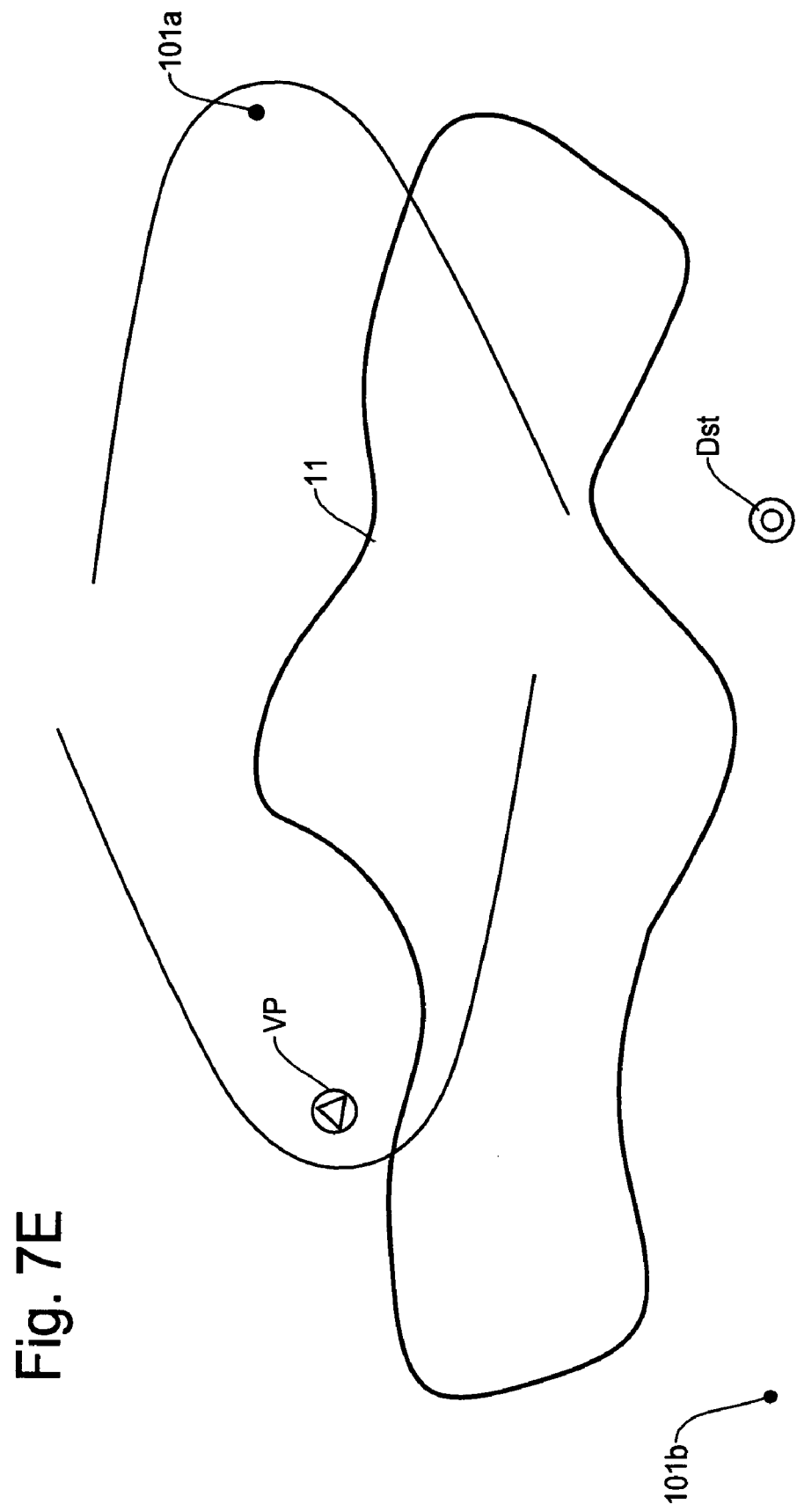

FIG. 7E shows a situation where the navigation system performs an A* algorithm search between the processing point 101a and the vehicle position VP. As shown by hyperbolic lines, the search directions and areas are oriented between the vehicle position VP and the processing point 101a. Thus, the navigation system will search a route toward the processing point 101a from the vehicle position VP to produce a second part of the another roundabout route. By connecting the first and second parts of the roundabout route, another candidate route between the vehicle position VP and the destination Dst is obtained. The navigation system will compare these calculated routes and select one of the routes as an optimum route based on the cost analysis (time, distance, drive conditions, fees, etc.).

Figure 1A:
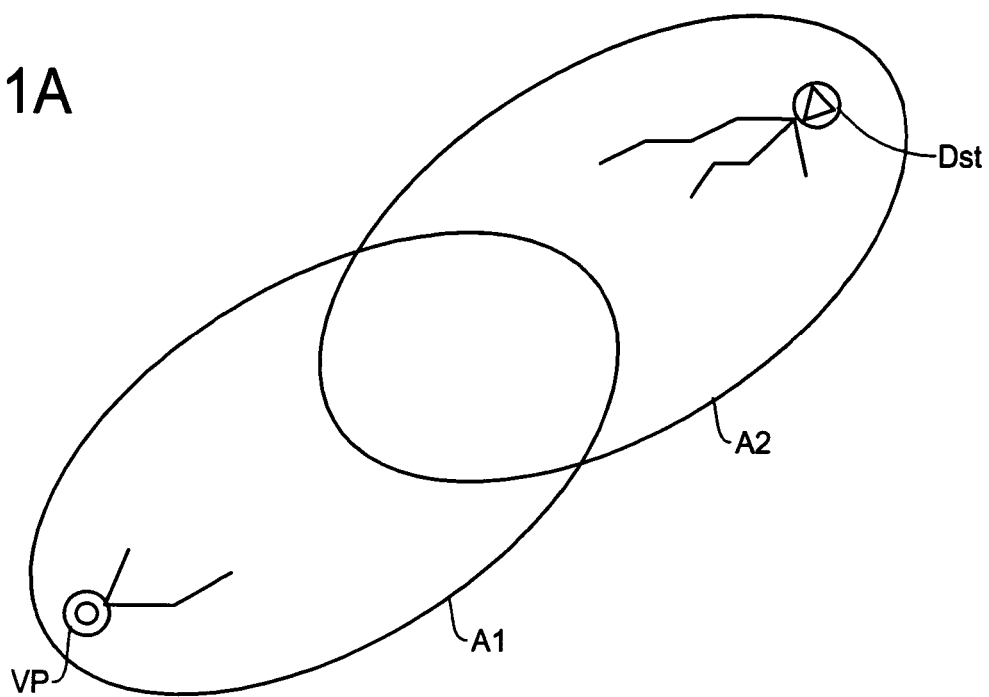
FIGS. 1A and 1B are schematic diagrams illustrating an example of finding a route from a start point to a destination under an A* algorithm search that starts search from both the start point and the destination.
Figure 1B:
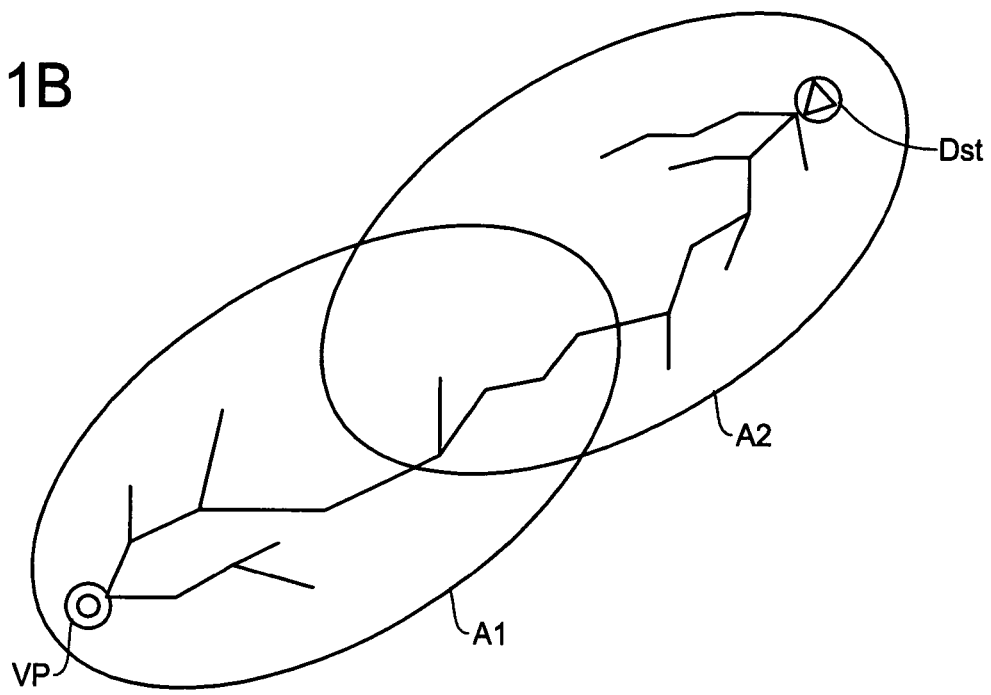
Figure 2A:
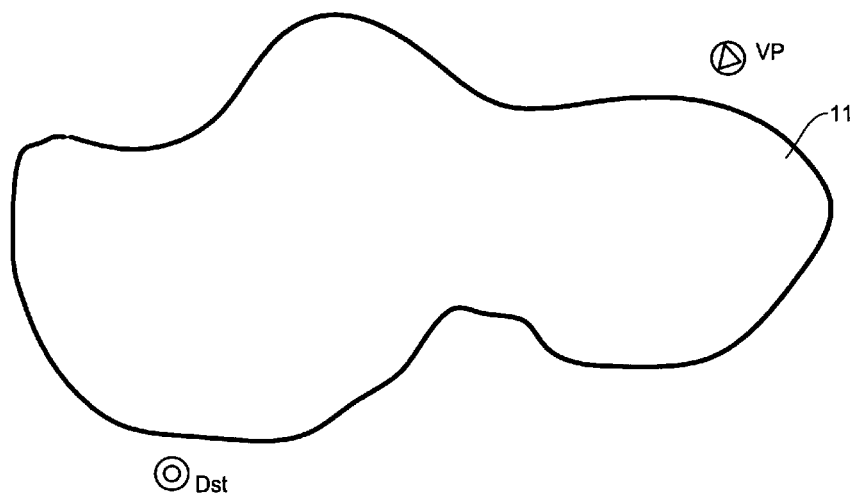
FIGS. 2A and 2B are schematic diagrams illustrating an example of finding a route from a start point to a destination under an A* algorithm search that starts search from both the start point and the destination when a route therebetween is intercepted by a large lake.
Figure 2B:
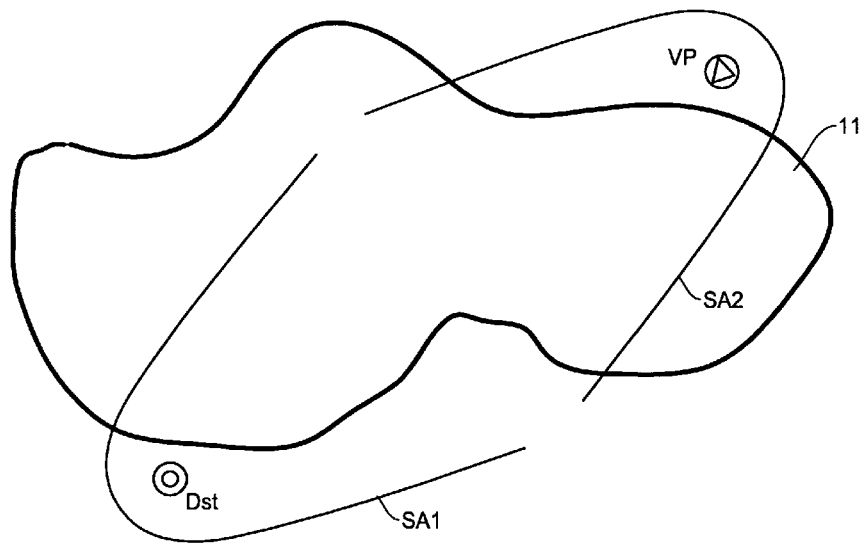
Figure 3:
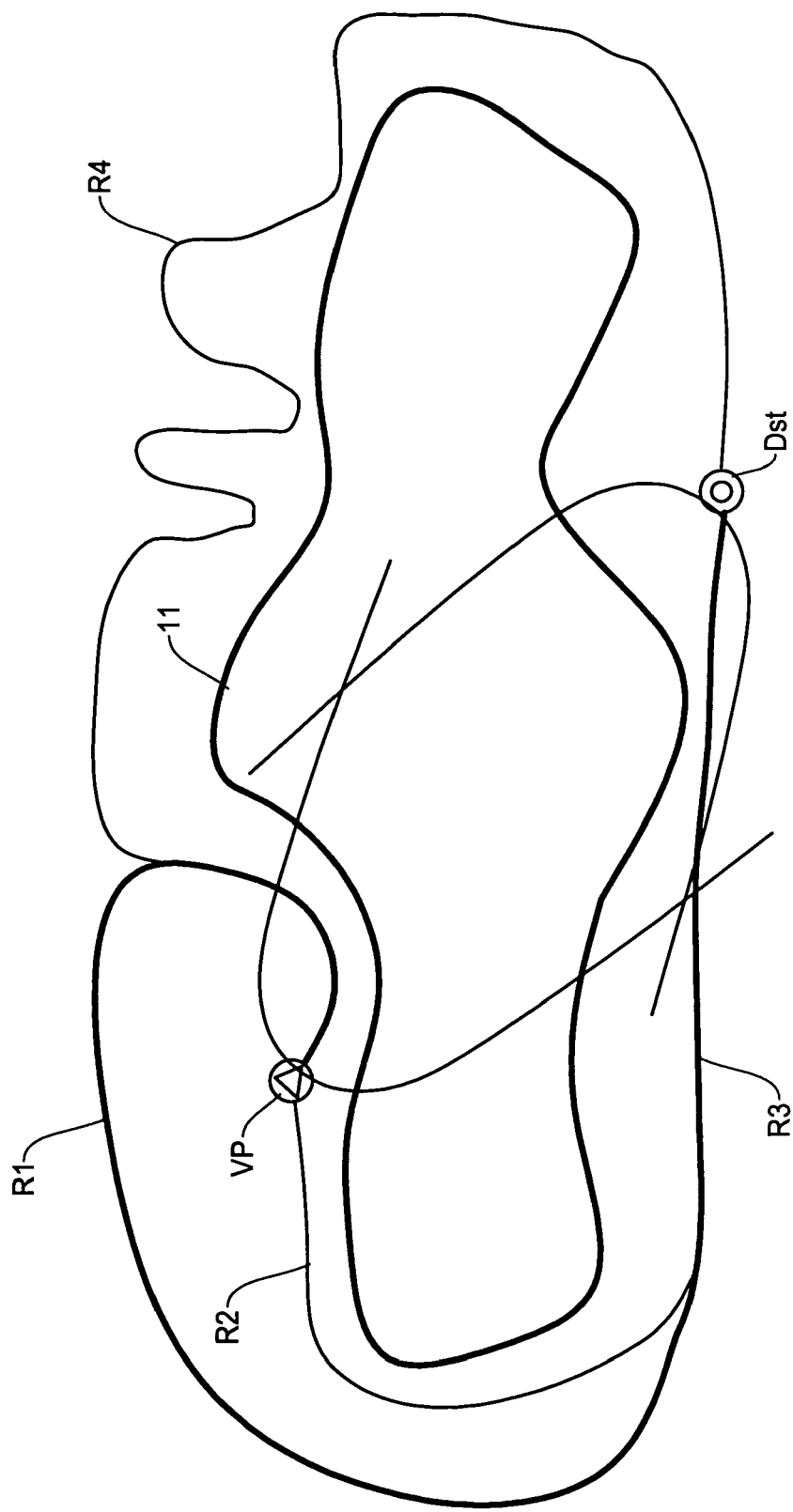
FIG. 3 is a schematic diagram showing a condition where an undesirable route from a current vehicle position to a destination is calculated due to the presence of an intercepting lake between the vehicle position and the destination.

FIGS. 8A to 8E are schematic diagrams showing the steps of calculating a route from the vehicle position VP (start point) to the destination Dst for the same situation as that of FIG. 3. Namely, the lake 11 (non-digitized area) and the road arrangement in FIGS. 8a-8E are the same as those of FIG. 3. In this example, the navigation system utilizes the processing points 101a and 101b created in the second embodiment described with reference to FIG. 7A for the route search processes.

Figure 8A:
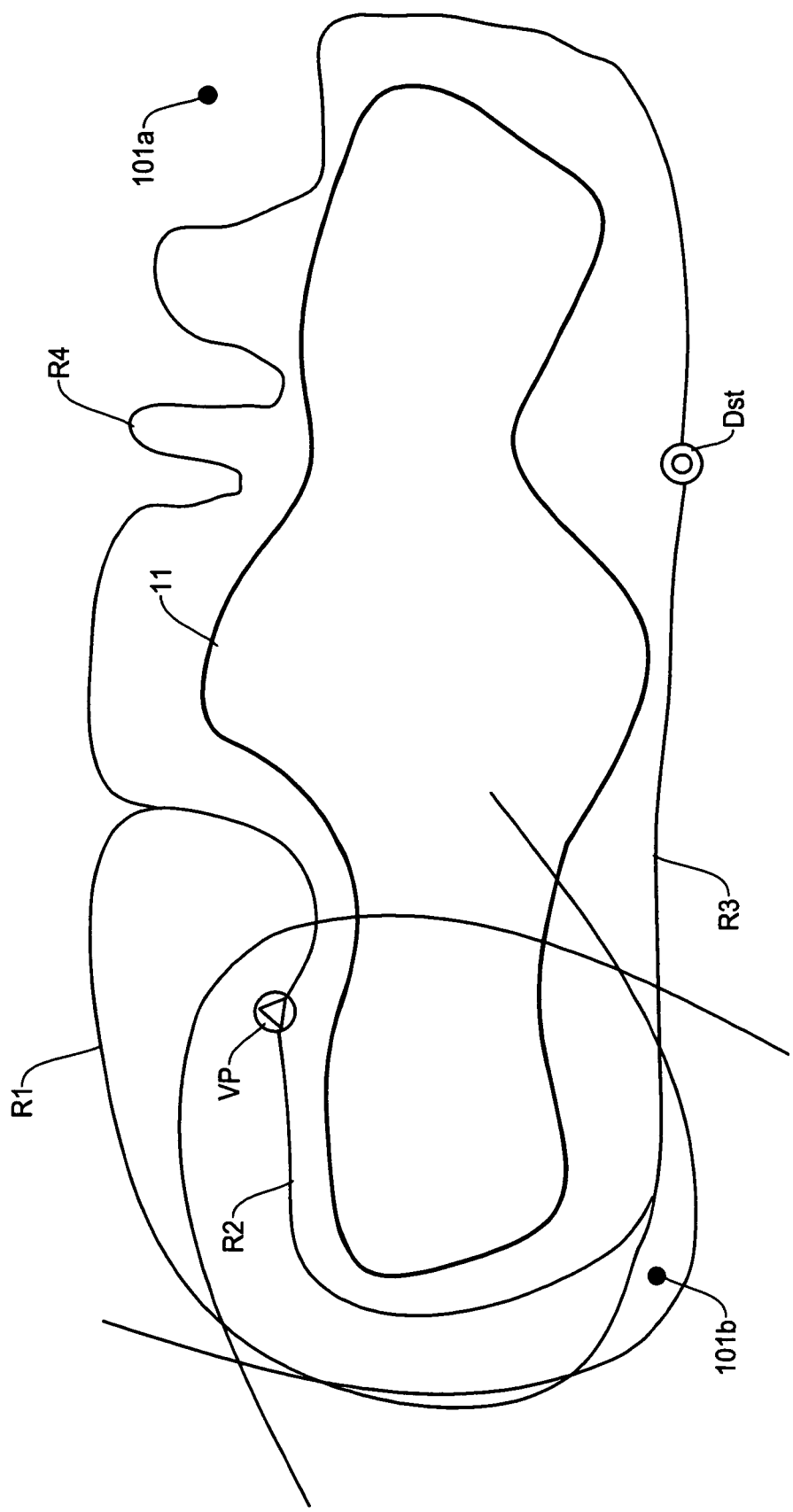
FIGS. 8A-8F are schematic diagrams showing the steps of determining a route from a start point to a destination in the present invention by using the processing points determined in FIG. 7A as applied to an actual road situation of FIG. 3.

FIG. 8A shows a situation where the navigation system performs an A* algorithm search between the vehicle position VP and the processing point 101b. As shown by hyperbolic lines, the search directions and areas are oriented between the vehicle position VP and the processing point 101b. The navigation system adjusts the curves of the hyperbolic lines to establish an appropriate size of the search areas. Thus, the navigation system will search a route toward the processing point 101b from the vehicle position VP, resulting in a route R2 as a part of the roundabout route. In the present invention, because the search direction and area are defined with respect to the vehicle position VP and the processing point 101b, the navigation system produces the route R2 rather than the route R1 in FIG. 3.

Figure 8B:
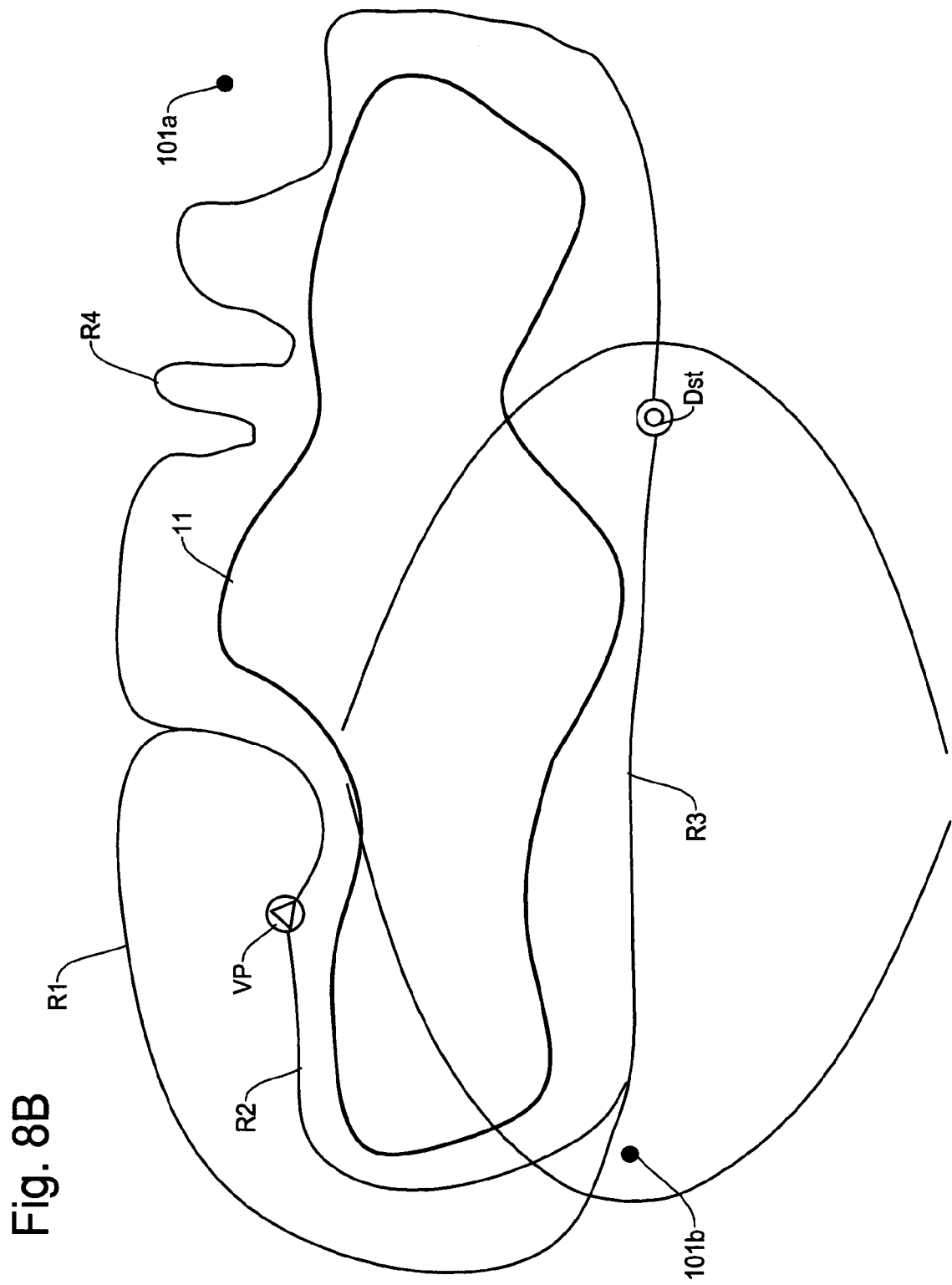

FIG. 8B shows a situation where the navigation system performs an A* algorithm search between the processing point 101b and the destination Dst. As shown by hyperbolic lines, the search directions and areas are oriented between the processing point 101b and the destination Dst. Thus, the navigation system will search a route toward the processing point 101b from the destination Dst, resulting in a route R3 as a part of the roundabout route.

Figure 8C:
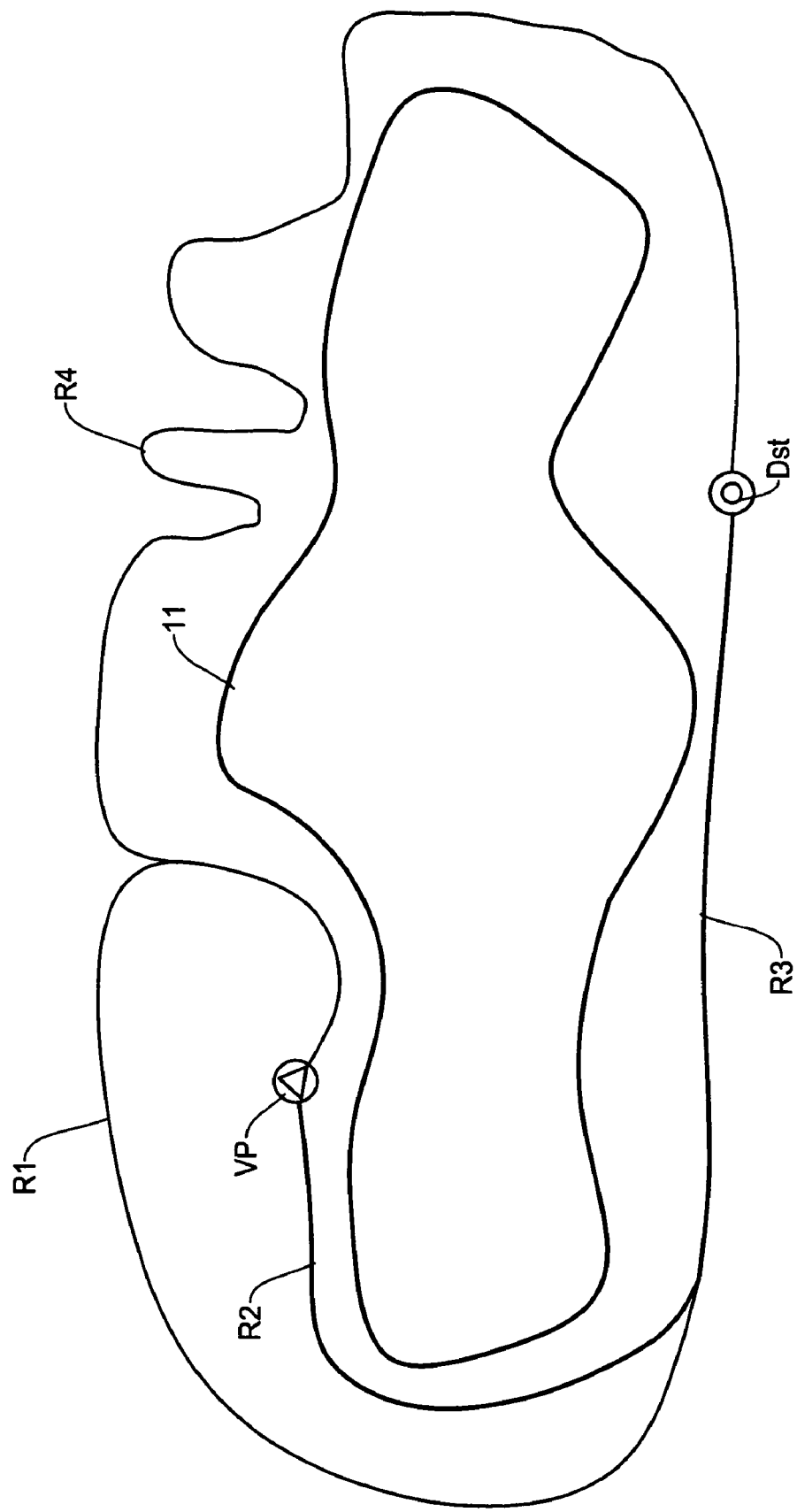

As result of the route search operations of FIGS. 8A and 8B, the navigation system produces a calculated route between the vehicle position VP and the destination Dst as shown by the bold line in FIG. 8C. This route is a combination of the route R2 found in the process of FIG. 8A and the route R3 found in the process of FIG. 8B. It is apparent that the calculated route of FIG. 8C is much more efficient (shorter) than the route calculated in the conventional example of FIG. 3.

Figure 8D:
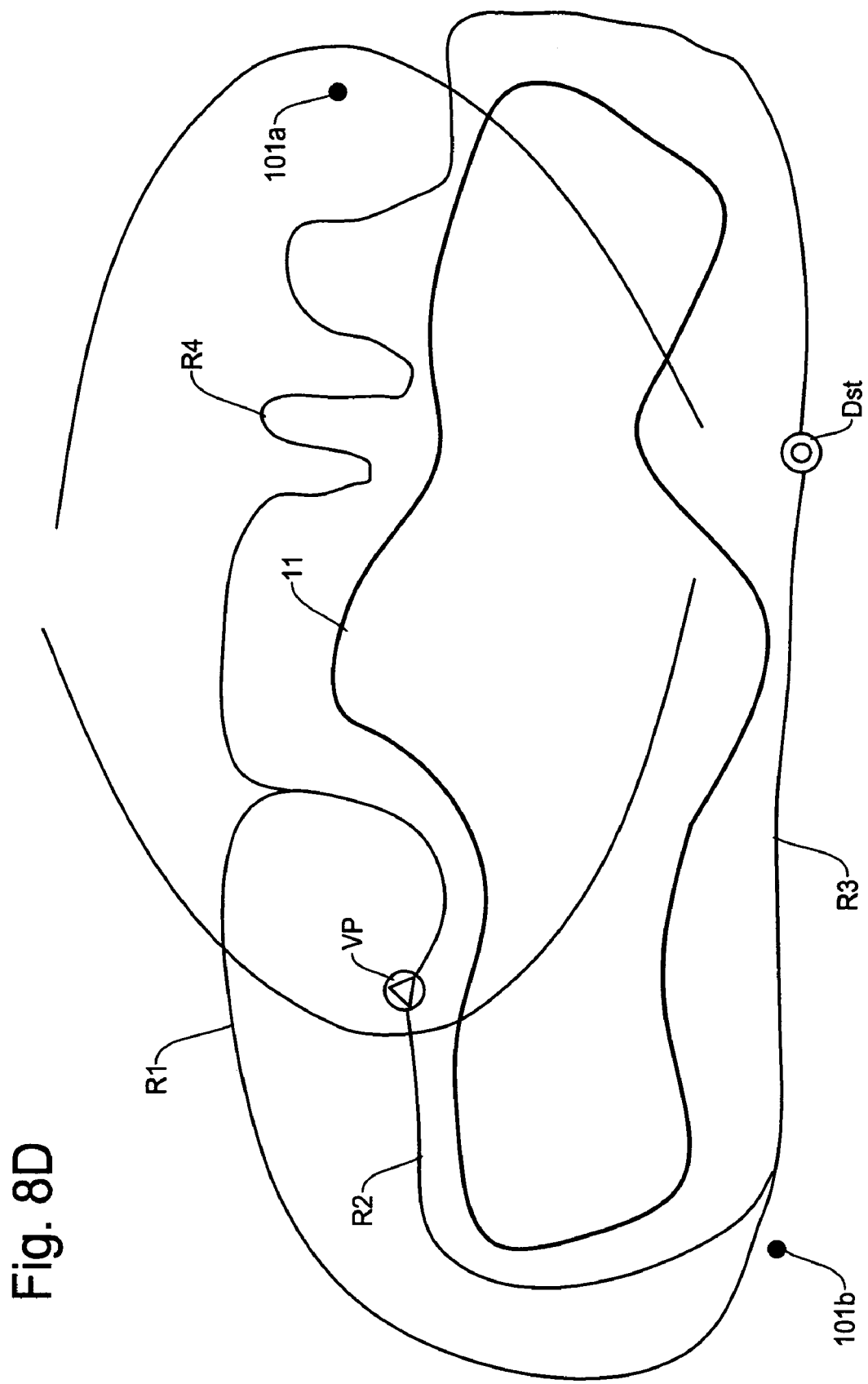

FIG. 8D shows a situation where the navigation system performs an A* algorithm search between the vehicle position Vp and the processing point 101a. As shown by hyperbolic lines, the search directions and areas are oriented between the vehicle position VP and the processing point 101a. Thus, the navigation system will search a route toward the processing point 101b from the vehicle position VP, resulting in a route R4 as a part of another roundabout route.

Figure 8E:
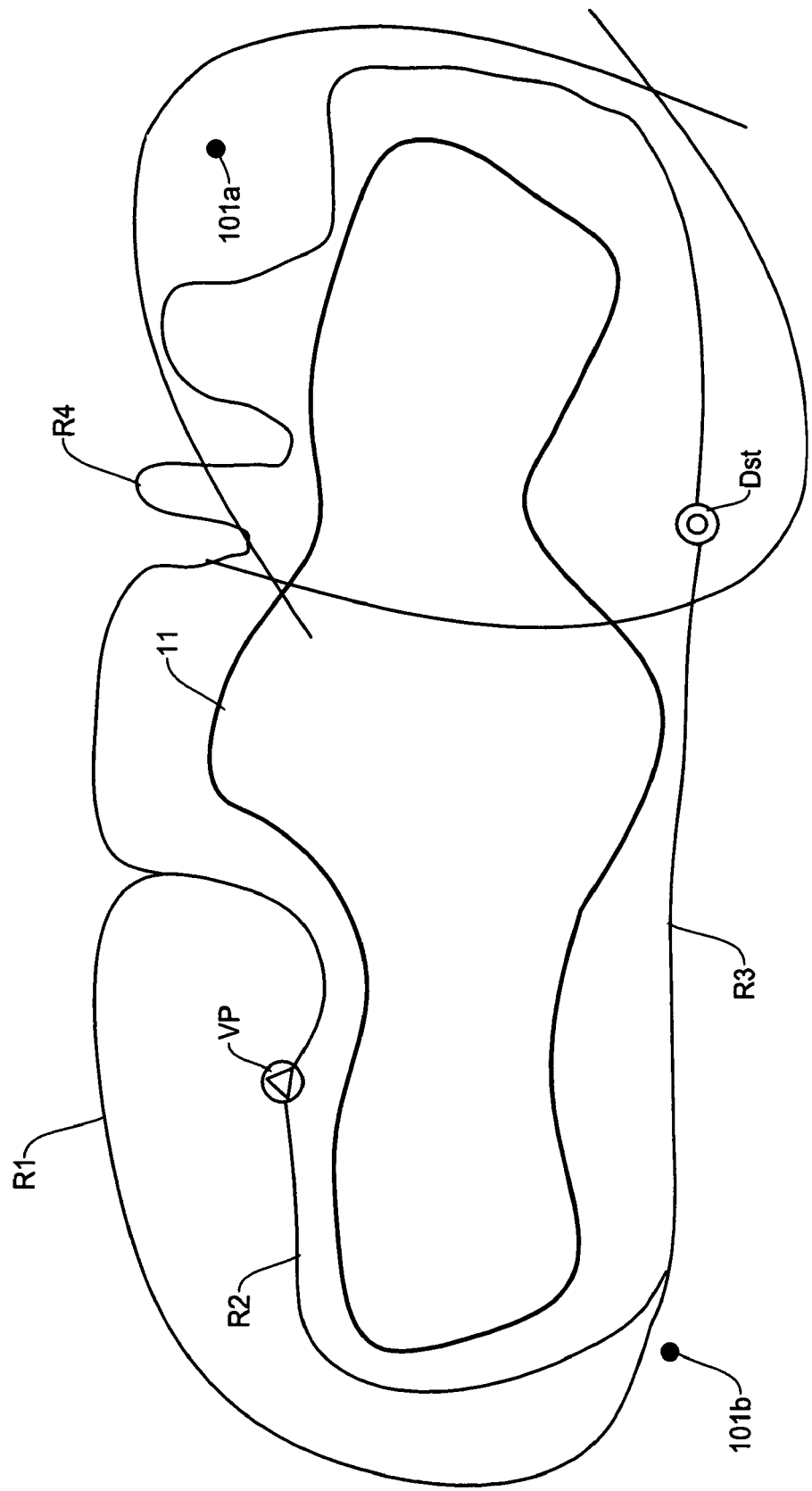

FIG. 8E shows a situation where the navigation system performs an A* algorithm search between the destination Dst and the processing point 101a. As shown by hyperbolic lines, the search directions and areas are oriented between the processing point 101a and the destination Dst. Thus, the navigation system will search a route toward the processing point 101a from the destination Dst, resulting in the remaining part of the route R4.

Figure 8F:
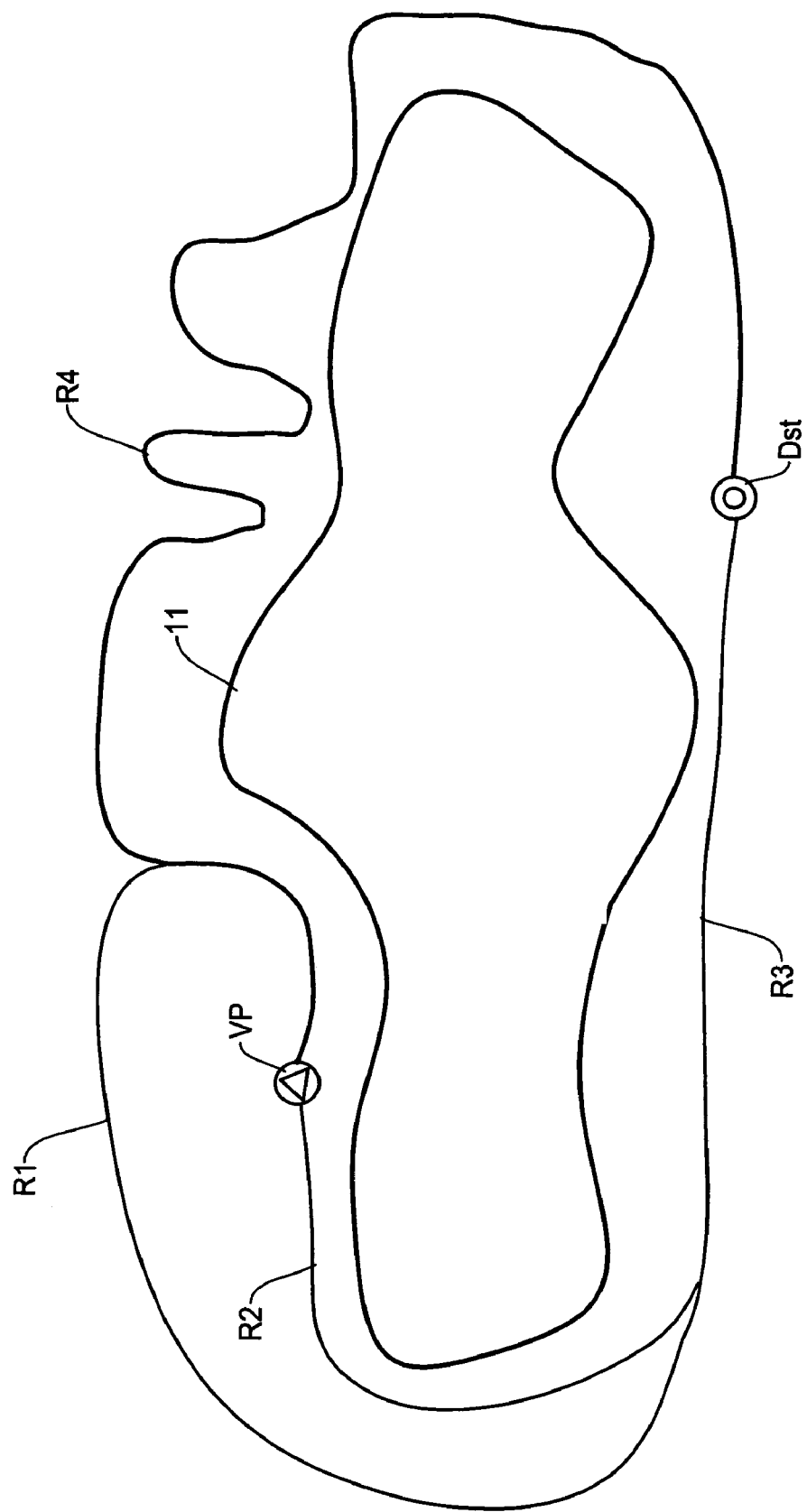

As result of the route search operations of FIGS. 8D and 8E, the navigation system produces a calculated route between the vehicle position VP and the destination Dst as shown in FIG. 8F. The navigation system will compare two calculated routes (FIGS. 8C and 8F) to determine the most desirable route. The navigation system may consider such factors as the distance, type of the road such as a freeway or residential road, ease of driving, etc. In this embodiment example, the navigation system will select the route that takes R2 and R3 due to its shorter distance and lesser curves.

Figure 9:
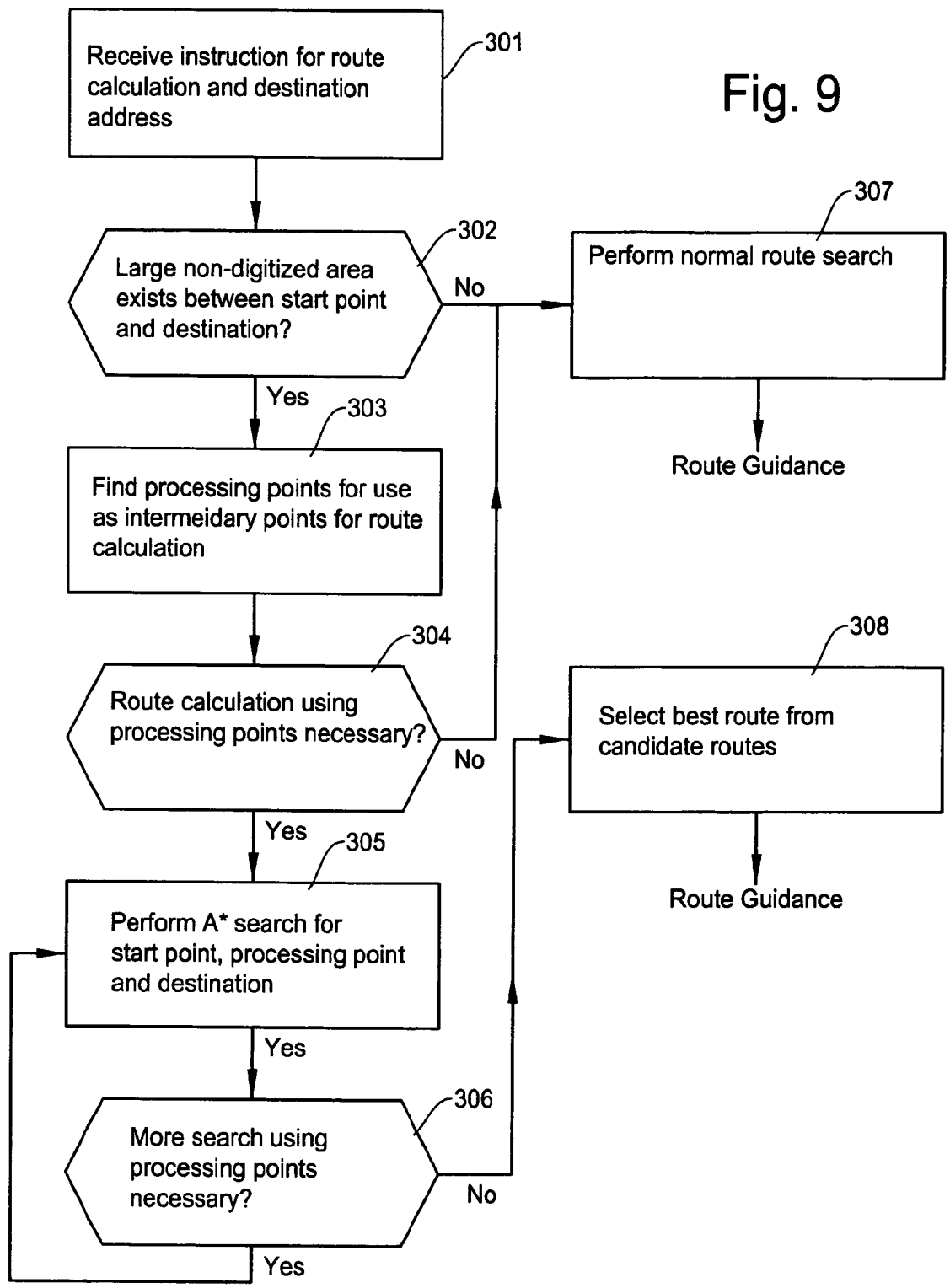
FIG. 9 is a flow chart showing the operational process for determining an efficient route from a start point to a destination that detours the large non-digitized area by the navigation system in the present invention.

FIG. 9 is a flow chart showing the operational process of the present invention for determining an effective route from a start point (vehicle position VP) to a destination when the large non-digitized area exists therebetween. In step 301, the navigation system receives an instruction from a user for route calculation and destination address. The destination address may be entered by the user or may be provided by the navigation system when the user selects a particular point of interest.

The navigation system determines if there is a large non-digitized area between the current vehicle position VP and the destination in step 302. Examples of large non-digitized area include a lake, a mountain without road, desert, military base, jungles, swamp, etc. In the map data, such a non-digitized area is represented by polygon data which is a type of data expressing a two dimensional shape, size and location of the area. Thus, the navigation system is able to detect such a large non-digitized area from the other components in the map data.

The navigation system will then create processing (midway) points to be used for route calculation to the selected destination in step 303. As described above, the navigation system may create the processing points by taking the farthest points of the longest line of the non-digitized area as depicted in FIG. 6B. In the alternative, the navigation system may take the corner points of a rectangle that encloses the non-digitized area as processing points as depicted in FIG. 7A. Other methods of finding processing points may also implemented in this step as well.

The navigation system determine if the route calculation using processing point is necessary in step 304. This procedure evaluates whether the route calculation using processing points will be advantageous. The evaluation is based on a particular shape, size, and location of the non-digitized area relative to the locations of the start point and the destination. More specifically, in the example in FIG. 6B, such determination is made based on (1) whether the straight line connecting the vehicle position VP and the destination and the longest line connecting the farthest points of the non-digitized area cross with one another, and (2) whether the longest line connecting the farthest points of the non-digitized area is longer than the straight line connecting the vehicle position VP and the destination.

If the conditions (1) and (2) are affirmative, the navigation system determines that the route search using the processing points is necessary. In the case where the navigation system determines that it is not necessary to use the processing points, the process moves to step 307 where the navigation system performs normal route search. Then, the route guidance operation is conducted to guide the user to the destination, and the process ends.

If the route calculation using the processing points is necessary, in step 305, the navigation system will perform at least two A* algorithm search operations using the processing point. In the first operation, the A* algorithm search is conducted between the processing point and the vehicle position VP (start point), which produces a first portion of the calculated route. In the second operation, the A* algorithm search is conducted between the processing point and the destination, which produces a second portion of the calculated route. By combining the first portion and the second portion, an overall calculated route which effectively detours the non-digitized area is established.

In step 306, the navigation system checks to see whether a further search operation using the processing point is necessary. In a case there is a remaining processing point to be used for the route search calculation, the navigation system will return to step 305 to find a route by repeating the procedures described above. For instance, the navigation system searches an additional route which is in a direction generally opposite to the previously established calculated route. This is because it is usually possible to create two roundabout routes one in a clockwise direction and the other in a counterclockwise direction around the non-digitized area such as a lake.

Finally, the navigation system will select the best route from the candidate routes obtained in the foregoing steps. In the example of FIGS. 8A-8E, the navigation system has established two the calculated routes indicated by the bold lines in FIGS. 8C and 8F, respectively. The navigation system will compare the two calculated routes to select the best route. The criteria for selecting the best route may include the distance, time, road conditions (ex. curves, number of lanes, up/down), fees, etc.

As has been described in the foregoing, according to the present invention, the navigation system is able to find an optimum route to a destination even when a large non-digitized area exists between a starting point to the destination. The navigation system produces processing points based on a particular shape and size of the large non-digitized area and determines whether such processing points should be used for route search operations. When it is determined that the route search operation is effective, the navigation system performs A* algorithm search operations with respect to the start point, processing points and the destination and detects an optimum route to detour the large non-digitized area.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A method of calculating a route from a start point to a destination based on map database, comprising the following steps of:
    determining whether a non-digitized area exists between the start point and the destination, where the non-digital area is an area in which no road segments are available in the map database;
    automatically creating a processing point that acts as an intermediary point between the start point and the destination if the non-digitized area exists;
    performing a first route search using an A* algorithm between the start point and the processing point to produce a first part of a calculated route;
    performing a second route search using an A* algorithm between the destination and the processing point to produce a second part of the calculated route; and
    combining the first part and second part to complete the calculated route that connects the start point and the destination.

2. A method of calculating a route as defined in claim 1, wherein the step of determining the existence of the non-digitized area includes a step of finding polygon data representing the non-digitized area through map data from a map storage medium.

3. A method of calculating a route as defined in claim 1, wherein the step of establishing the processing point includes a step of finding two furthest points of the non-digitized area.

4. A method of calculating a route as defined in claim 1, wherein the step of establishing the processing point includes a step of creating a rectangle each side of which contacts with farthest point of the non-digitized area or is apart from the farthest points of the non-digitized area by a predetermined distance.

5. A method of calculating a route as defined in claim 1, further comprising the step of determining whether a route search operation using the processing point is necessary based on a particular shape, size, and location of the non-digitized area relative to the locations of the start point and the destination.

6. A method of calculating a route as defined in claim 5, wherein the step of determining whether the route search operation using the processing point is necessary includes a step of comparing the length of a straight line from the start point to the destination and a straight line between two furthest points of the non-digitized area.

7. A method of calculating a route as defined in claim 5, wherein the step of determining whether the route search operation using the processing point is necessary includes a step of determining whether a straight line connecting the start point and the destination and a longest line connecting two farthest points of the non-digitized area cross with one another, and a step of determining whether the longest line connecting the farthest points of the non-digitized area is longer than the straight line connecting the start point and the destination.

8. A method of calculating a route as defined in claim 1, wherein two calculated routes that roundabout the non-digitized area are produced by applying the route search operations to two processing points.

9. A method of calculating a route as defined in claim 8, further comprising the step of comparing the two calculated routes with respect to predetermined criteria and selecting one of the routes as an optimum route between the start point and the destination.

10. An apparatus of calculating a route from a start point to a destination based on map database, comprising:
- a map storage medium having the map database which stores road segments data and other map data related to determining a preferable route between a start point and a destination;
- a monitor for displaying information and images related to operations of determining the preferable route and route guidance to the destination;
- a route search controller for controlling overall operations of a route search process for determining the preferable route between the start point and the destination and a route guidance process for guiding a user to the destination through the preferable route;
- a memory for temporally storing data necessary for the route search process;
- wherein the route search controller controls the following operations of:
  - determining whether a non-digitized area exists between the start point and the destination, where the non-digital area is an area in which no road segments are available in the map database;
  - automatically creating a processing point that acts as an intermediary point between the start point and the destination if the non-digitized area exists;
  - performing a first route search using an A* algorithm between the start point and the processing point to produce a first part of a calculated route;
  - performing a second route search using an A* algorithm between the destination and the processing point to produce a second part of the calculated route; and
  - combining the first part and second part to complete the calculated route that connects the start point and the destination.

11. An apparatus of calculating a route as defined in claim 10, wherein the route search controller further controls an operation of finding polygon data representing the non-digitized area through map data from a map storage medium.

12. An apparatus of calculating a route as defined in claim 10, wherein the route search controller further controls an operation of finding two furthest points of the non-digitized area.

13. An apparatus of calculating a route as defined in claim 10, wherein the route search controller further controls an operation of creating a rectangle each side of which contacts with farthest point of the non-digitized area or is apart from the farthest points of the non-digitized area by a predetermined distance.

14. An apparatus calculating a route as defined in claim 10, wherein the route search controller further controls an operation of determining whether a route search operation using the processing point is necessary based on a particular shape, size, and location of the non-digitized area relative to the locations of the start point and the destination.

15. An apparatus of calculating a route as defined in claim 14, wherein the route search controller further controls an operation of comparing the length of a straight line from the start point to the destination and a straight line between two furthest points of the non-digitized area.

16. An apparatus of calculating a route as defined in claim 14, wherein the route search controller further controls operations of determining whether a straight line connecting the start point and the destination and a longest line connecting two farthest points of the non-digitized area cross with one another, and determining whether the longest line connecting the farthest points of the non-digitized area is longer than the straight line connecting the start point and the destination.

17. An apparatus of calculating a route as defined in claim 10, wherein two calculated routes that roundabout the non-digitized area are produced by applying the route search operations to two processing points.

18. An apparatus of calculating a route as defined in claim 17, wherein the route search controller further controls an operation of comparing the two calculated routes with respect to predetermined criteria and selecting one of the routes as an optimum route between the start point and the destination.

* * * * *